(12) United States Patent
Matsubayashi et al.

(10) Patent No.: US 7,200,587 B2
(45) Date of Patent: Apr. 3, 2007

(54) METHOD OF SEARCHING SIMILAR DOCUMENT, SYSTEM FOR PERFORMING THE SAME AND PROGRAM FOR PROCESSING THE SAME

(75) Inventors: Tadataka Matsubayashi, Yokohama (JP); Katsumi Tada, Kawasaki (JP); Yoshifumi Sato, Yokohama (JP); Yasuhiko Inaba, Yokohama (JP); Jugo Noda, Ikeda (JP)

(73) Assignee: Hitachi, Ltd., Tokyo (JP)

( * ) Notice: Subject to any disclaimer, the term of this patent is extended or adjusted under 35 U.S.C. 154(b) by 264 days.

(21) Appl. No.: 10/081,203

(22) Filed: Feb. 25, 2002

(65) Prior Publication Data

US 2003/0065658 A1    Apr. 3, 2003

(30) Foreign Application Priority Data

Apr. 26, 2001    (JP)    ............................. 2001-128934

(51) Int. Cl.
G06F 17/30    (2006.01)
G06F 17/00    (2006.01)

(52) U.S. Cl. ................... 707/3; 707/1; 707/2; 715/500
(58) Field of Classification Search ............. 707/1–10; 715/500, 511
See application file for complete search history.

(56) References Cited

U.S. PATENT DOCUMENTS 5,991,755 A * 11/1999 Noguchi et al. ............... 707/3
6,112,203 A * 8/2000 Bharat et al. ................... 707/5
6,212,517 B1   4/2001 Sato et al.
6,473,754 B1   10/2002 Matsubayashi et al. ........ 707/5
6,480,843 B2 * 11/2002 Li ................................. 707/5

FOREIGN PATENT DOCUMENTS

JP    11259487    9/1999
JP    11338883    12/1999

OTHER PUBLICATIONS

Informational Retrieval-Data Structures & Algorithms, by W. Frankes, et al., Prentice Hall, 1992.

* cited by examiner

*Primary Examiner*—Don Wong
*Assistant Examiner*—Marc Filipczyk
(74) *Attorney, Agent, or Firm*—Mattingly, Stanger, Malur & Brundidge, P.C.

(57) ABSTRACT

A similar document search method includes a step of extracting a characteristic word candidate as a candidate for a characteristic word from a seeds document including desired retrieval contents, a step of extracting as characteristic words of the seeds document, when the characteristic word candidate extracted by the extracting step is a compound characteristic word including a plurality of characteristic words, the compound characteristic word and constituent characteristic words included in the compound characteristic word from the characteristic word candidate, a step of calculating, according to the characteristic words extracted by the extracting step, similarity between the seeds document and a registration document, and a step of outputting as a retrieval result a result of the similarity calculated by the similarity calculating step.

3 Claims, 18 Drawing Sheets

METHOD OF SEARCHING SIMILAR DOCUMENT, SYSTEM FOR PERFORMING THE SAME AND PROGRAM FOR PROCESSING THE SAME

BACKGROUND OF THE INVENTION

The present invention relates to a similar document searching system to search for a document similar to a specified document, and in particular, to a searching system, a searching method, and a program for processing the searching method efficiently applicable to a document including compound words each of which includes a plurality of words.

To increase efficiency and quality of a business in an organization, demands for a knowledge management system in which knowledge of members of the organization is shared between the members for reuse of the knowledge are becoming stronger these days.

Particularly, in a knowledge management system for use in a firm, documentation of experiences, know-how, and the like of experts is increasingly desired to share and to use the experiences and know-how in documents resulted from the documentation. A high-precision search or retrieval function to simply and appropriately searches a large amount of knowledge accumulated in various forms in the organization of the firm for information desired by the user is quite important in the knowledge management system.

A similar document search technique which satisfies the requirement and in which the user presents an example of a document (to be referred to as a seeds document or a query document hereinbelow) including the contents desired by the user to thereby retrieve a document similar to the document has attracted attention.

A similar document searching method has been described, for example, in pages 363 to 376 of Ranking Algorithms, Section 14, Donua Harman of "Information Retrieval" written by William B. Frakes and published from Prentice Hall PTR (1992). This technique (to be referred to as prior art technique 1 hereinbelow) uses a vector (to be referred to as a characteristic vector hereinbelow) including a term appearance frequency or a term frequency of a word (to be referred to as a characteristic word hereinbelow) appearing in a document to calculate similarity between documents according to the characteristic vector.

An outline of prior art technique 1 is as follows. When a document is registered to a document database, a term frequency of a characteristic word included in the document to be registered is created as a characteristic vector (to be referred to as a registration document characteristic vector hereinbelow) of the registration document in advance.

To retrieve a similar document, a cosine of an angle in a vector space between a characteristic vector (to be referred to as a seeds document characteristic vector) of a seeds document specified as a retrieval condition and each registration document characteristic vector is calculated as similarity between the documents.

FIG. 20 shows an example of a processing procedure in prior art technique 1.

First, in step 200, a check is made to execute document registration processing or similar document search processing. If the document registration processing is to be executed, the program executes step 210 to generate a registration document characteristic vector. That is, a registration document characteristic vector is created for the document to be registered.

If step 200 determines to execute the similar document search processing, the program executes step 220 to generate a seeds document characteristic vector for a seeds document specified as a retrieval condition.

Next, in step 221, step 222 to calculate similarity is repeatedly executed for all registration documents. That is, a cosine of an angle between the seeds document characteristic vector characteristic vector and the registration document characteristic vector in the vector space is calculated as similarity between the documents.

FIG. 21 shows an example of the characteristic vector generation processing in prior art technique 1.

In this processing, the program first reads a document to be used to create a characteristic vector in step 301. In step 302, the program extracts each characteristic word from the document read in step 301.

In step 303, a term frequency is calculated for each characteristic word extracted in step 302. Finally, in step 304, the characteristic words extracted in step 302 and the term frequency calculated for each characteristic word in step 303 are stored as elements of the characteristic vector. The processing procedure of prior art technique 1 has been described.

FIG. 22 shows an outline of prior art technique 1.

According to prior art technique 1, processing request determining step 410 determines that a processing request inputted to the system is a request for registration or retrieval processing. If the registration processing is requested, step 210 is executed.

In step 210, the program extracts characteristic words contained in registration documents 1 and 2, calculates a term frequency of each characteristic word in each document, and generates registration document characteristic vectors 403 and 404 for registration documents 1 and 2, respectively.

A registration document characteristic vector 403 "document1 ("LAN,1") ("構築",1) . . . " is a characteristic vector of "document 1" and indicates that a characteristic word "LAN" appears once and a characteristic word "構築" appears once.

If step 410 determines that the retrieval processing is requested to retrieve a similar document, the program extracts characteristic words from a specified seeds document 406. In step 220, the program generates a seeds document characteristic vector 407 for the seeds document 406.

The program then calculates as similarity a cosine of an angle between the seeds document characteristic vector 407 and the registration document characteristic vector of each registration document generated in step 210.

In general, a cosine of an angle between vectors A and B is expressed as follows.

$$\text{Similarity} = \text{Cosine of angle between vectors } A \text{ and } B \quad (1)$$
$$= \frac{A \cdot B}{|A| \times |B|}$$

where, "A·B" is an inner product between vectors A and B and |A| is a magnitude of vector A.

Cosines of angles respectively between the seeds document characteristic vector 407 and the registration document characteristic vectors 403 and 404 shown in FIG. 22 are respectively calculated as below. In these expressions (2) and (3), vector A indicates the seeds document characteristic vector 407 and vector B indicates the registration document characteristic vector 403 or 404.

$$\text{Cosine of angle between vectors 407 and 403} = \frac{1\times 0 + 1\times 0 + 1\times 1 + 1\times 0}{\sqrt{1^2+1^2+1^2+1^2} \times \sqrt{1^2+1^2+1^2+1^2+1^2+1^2}} \quad (2)$$

$$= \frac{1}{2\sqrt{6}} = 0.204$$

$$\text{Cosine of angle between vectors 407 and 404} = \frac{1\times 1 + 1\times 1 + 1\times 1 + 1\times 0}{\sqrt{1^2+1^2+1^2+1^2} \times \sqrt{1^2+1^2+1^2+1^2+1^2+1^2}} \quad (3)$$

$$= \frac{3}{2\sqrt{5}} = 0.670$$

Resultantly, the program produces a similarity calculation result 408 of each registration document for the seeds document. A processing example of prior art technique 1 has been described.

In prior art technique 1 described above, characteristic words are extracted from registration documents to generate registration document characteristic vectors in advance. When a seeds document is specified as a retrieval condition, a cosine between a seeds document characteristic vector of the seeds document and each of the registration document characteristic vector is calculated as similarity to retrieve a document having the contents similar to those of the seeds document from a document database.

However, prior art technique 1 has a problem. That is, when a characteristic word as an element of the characteristic vector is a compound word including a plurality of words, some similar documents cannot be retrieved depending on cases.

FIG. 23 shows the problem of prior art technique 1. The problem will now be described by referring to FIG. 23. In this example shown in FIG. 23, the user inputs a seeds document 「最新の地図閲覧ソフトについて」to a document database to which document 3 「地図情報閲覧ソフトを開発発売したA社は．　．　．　」 and document 4「多くの地図閲覧ソフトが発売されているが．．．」are beforehand registered.

First, document registration processing is executed in step 210 to generate registration document characteristic vectors 403*a* and 404*a* for the respective documents. In the example, the characteristic vector 403*a* for document 3 is "document 3 ("地図",1) ("閲覧",1) ("ソフト",1) ("発売",1)" and the characteristic vector 404*a* for document 4 is "document 4 ("地図閲覧ソフト",1) ("発 売",1)".

Next, similar document search processing is executed in step 220 to generate a seeds document characteristic vector 407*a* for the seeds document. In this example, the generated seeds document characteristic vector 407*a* is "seeds document ("地図閲覧ソ フト",1)".

In step 222, similarity of each registration document is calculated for the seeds document to resultantly produce a similarity calculation result 408*a*. In the example, values 0.000 and 0.710 of similarity respectively of documents 3 and 4 are obtained as below.

$$\text{Similarity} = \frac{1\times 0}{\sqrt{1^2} \times \sqrt{1^2+1^2+1^2+1^2}} \quad (4)$$

$$= \frac{0}{2} = 0.000$$

$$\text{Similarity} = \frac{1\times 1}{\sqrt{1^2} \times \sqrt{1^2+1^2}} \quad (5)$$

$$= \frac{1}{\sqrt{2}} = 0.710$$

As a result, although the contents of document 3 are related to the seeds document, the calculation result of prior art technique 1 disadvantageously indicates that document 3 is not related to the seeds document at all.

This occurs as follows. Although a characteristic word extracted as an element of the seeds document characteristic vector includes a plurality of words, only the characteristic word "地図閲 覧ソフト"" for a longest matching condition is employed as the element of the characteristic vector in the similarity calculation. Therefore, the concept of each word constituting the characteristic word is not reflected in the similarity. In short, similarity is not assigned to a registration document including each word constituting the characteristic word, and hence such a registration document is not retrieved.

On the other hand, the disadvantage case described above can be prevented by using each of the words included in ""地図閲覧ソフト",", namely, ""地図", "閲覧"" and ""ソフト"" in place of the characteristic word ""地図閲覧 ソフト"" for a longest matching condition. However, this possibly increases a chance case in which a document having a lower degree of similarity to "地図閲覧ソフト" is retrieved as noise. Problems of prior art technique 1 have been described.

SUMMARY OF THE INVENTION

It is therefore an object of the present invention, which has been devised to remove the problems, to provide a technique in which a high-precision similar text or document retrieval is conducted without missing any similar documents and in which a document having the documents similar to those of a specified document can be particularly retrieved with high precision.

Another object of the present invention is to provide a technique capable of implementing a high-precision similar document retrieval in which all similar documents are retrieved with reduced noise.

In the similar document searching system of the present invention, a check is made for a characteristic word candidate extracted from a document to be processed to determine the candidate is a compound characteristic word including a plurality of characteristic words or a single characteristic word including one word. For a compound characteristic word, the compound characteristic word and a plurality of characteristic words constituting the compound characteristic word are extracted as characteristic words. For a single characteristic word, the single characteristic word itself is extracted.

That is, a compound characteristic word and a plurality of characteristic words constituting the compound characteristic word are extracted as characteristic words such that the extracted characteristic words are used to calculate similarity. This advantageously leads to a high-precision similar document retrieval without missing any similar documents.

BRIEF DESCRIPTION OF THE DRAWINGS

The present invention will be more apparent from the following detailed description, when taken in conjunction with the accompanying drawings, in which.

DESCRIPTION OF THE EMBODIMENTS (First Embodiment)

Description will now be given of a first embodiment of a similar document searching or retrieval system in which a document including a compound characteristic word and constituent characteristic words of the compound characteristic word selected from a specified seeds document is retrieved as a similar document.

Figure 1:
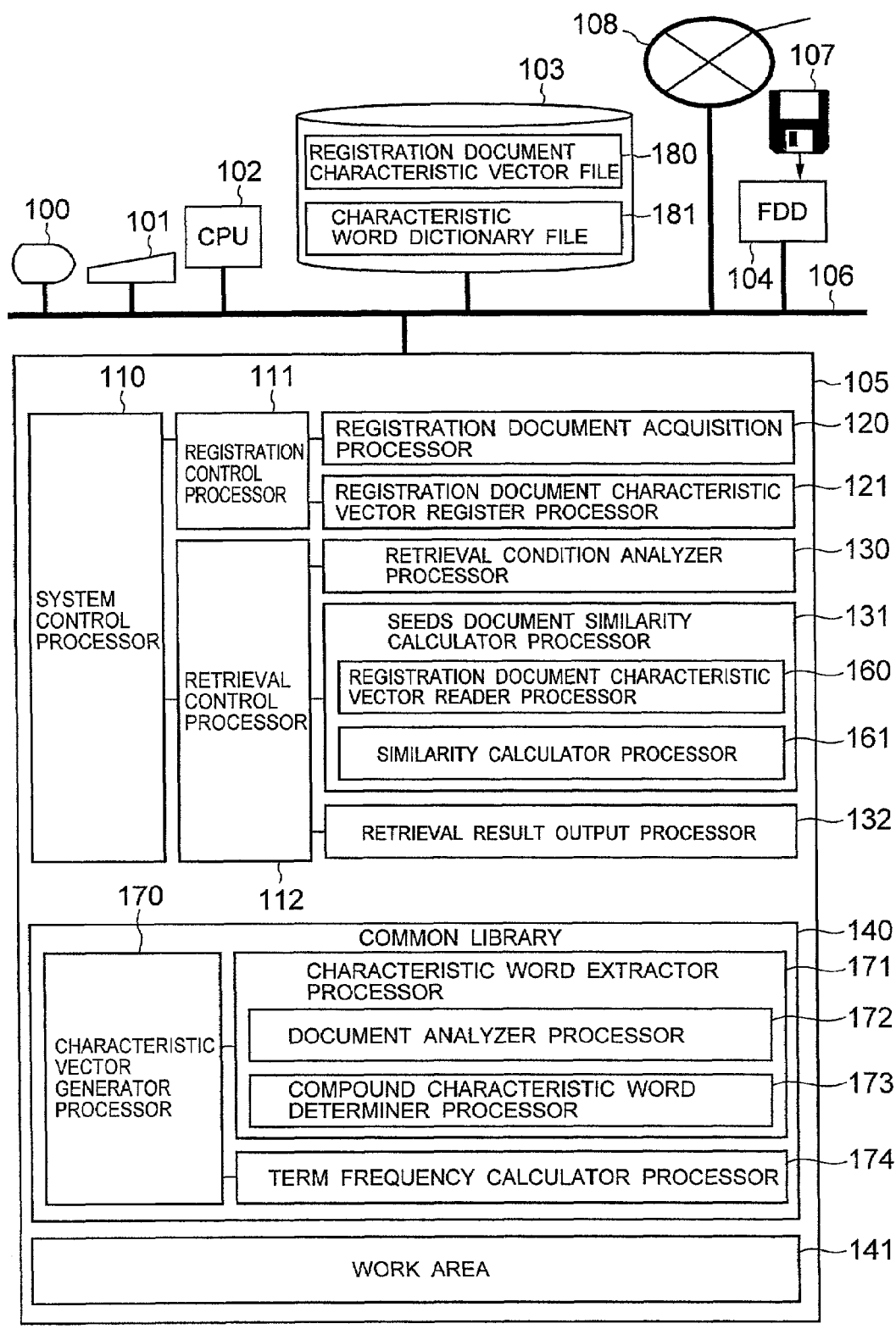
FIG. 1 is a block diagram showing an outline of constitution of a first embodiment of a similar document searching system.

FIG. 1 shows a general configuration of the first embodiment of the similar document or text retrieval system. The first embodiment includes a system control processor 110, a registration control processor 111, a retrieval control processor 112, a registration document acquisition processor 120, a registration document characteristic vector register processor 121, a retrieval condition analyzer processor 130, a seeds document similarity calculator processor 131, a retrieval result output processor 132, a registration document characteristic vector reader processor 160, a similarity calculator processor 161, a characteristic vector generator processor 170, a characteristic word extractor processor 171, a document analyzer processor 172, a compound characteristic word determiner processor 173, and a term frequency calculator processor 174.

The system control processor 110 analyzes a command received from a keyboard 101 to activate the registration control processor 111 or the retrieval control processor 112. The registration control processor 111 activates the registration document acquisition processor 120 and controls an operation to stored characteristic vectors of a document specified as an object of the processing in a magnetic disk device 103.

The retrieval control processor 112 activates the retrieval condition analyzer processor 130, the seeds document similarity calculator processor 131, and the retrieval result output processor 132 and controls an operation to retrieve documents similar to a seeds document specified as a retrieval condition.

The registration document acquisition processor 120 is a processing block to obtain a document to be registered. The characteristic vector register processor 121 stores in the magnetic disk device 103 characteristic vectors of a document to be registered. The retrieval condition analyzer processor 130 is a processing block to obtain a seeds document specified as a retrieval condition.

The seeds document similarity calculator processor 131 activates the registration document characteristic vector reader processor 160 and the similarity calculator processor 161 to calculate similarity between a characteristic word extracted from a seeds document and each registration document. The retrieval result output processor 132 receives a result of the similarity calculation from the similarity calculator processor 161 and outputs the similarity as a retrieval result.

The registration document characteristic vector reader processor 160 reads a registration document characteristic vector file 180 from the magnetic disk device 103. The similarity calculator processor 161 calculates a cosine of an angle between a registration document characteristic vector and a seeds document characteristic vector to thereby obtain similarity of the registration document to the seeds document.

The characteristic vector generator processor 170 activates the characteristic word extractor processor 171 and the document analyzer processor 172. If a characteristic word candidate of an objective document to be processed is a compound characteristic word including a plurality of characteristic words, the characteristic vector generator processor 170 extracts the compound characteristic word and constituent characteristic words included in the compound characteristic word, as characteristic words of the objective document and resultantly generates a characteristic vector of the objective document.

The characteristic word extractor processor 171 activates the document analyzer processor 172 and the compound characteristic word determiner processor 173 to extract from the objective document a characteristic word or a compound characteristic word and constituent characteristic words included in the compound characteristic word. The document analyzer processor 172 extracts characteristic word candidates as candidates for characteristic words from a registration document to be registered and an objective document such as a seeds document including the desired retrieval contents.

The compound characteristic word determiner processor 173 is a processing section which determines, when a characteristic word corresponding to the extracted characteristic word candidate includes pointer information of constituent characteristic words registered as constituent characteristic word information indicating constituent characteristic words of the characteristic word, that the characteristic word candidate is a compound characteristic word. The term frequency calculator processor 174 calculates, for each characteristic word extracted from the objective document, a term frequency of the characteristic word in the objective document.

Assume that a program to implement the functions of the system control processor 110, the registration control processor 111, the retrieval control processor 112, the registration document acquisition processor 120, the registration document characteristic vector register processor 121, the retrieval condition analyzer processor 130, the seeds document similarity calculator processor 131, the retrieval result output processor 132, the registration document characteristic vector reader processor 160, the similarity calculator processor 161, the characteristic vector generator processor 170, the characteristic word extractor processor 171, the document analyzer processor 172, the compound characteristic word determiner processor 173, and the term frequency calculator processor 174 in the similar document retrieval system is recorded on a recording medium such as a compact disk read-only memory (CD-ROM) and is then stored on a magnetic disk or the like to be thereafter loaded in the system for execution thereof. The program may be stored on a recording medium other than a CD-ROM. The program may be installed from the recording medium in an information processor for use thereof. Alternatively, the program may be obtained from the recording medium via a network.

The similar document retrieval system in this embodiment includes a display 100, a keyboard 101, a central processing unit (CPU) 102, a magnetic disk device 103, a floppy disk drive (FDD) 104, a main memory 105, a bus 106 connecting the constituent components to each other, and a network 108 to connect the similar document retrieval system to another apparatus.

The magnetic disk device 103 is a secondary storage to store the registration document characteristic vector file 180 and a character word dictionary file 181. Information stored on a floppy disk 107 via the floppy disk drive 104 is read therefrom to be fed to the main memory 105 or the magnetic disk device 103.

In the main memory 105, the system control processor 110, the registration control processor 111, the retrieval control processor 112, the registration document acquisition processor 120, the registration document characteristic vector register processor 121, the retrieval condition analyzer processor 130, the seeds document similarity calculator processor 131, and the retrieval result output processor 132 are stored and the work area is reserved. In the common library 140, the characteristic vector generator processor 170, the characteristic word extractor processor 171, and the term frequency calculator processor 174 are stored.

The seeds document similarity calculator processor 131 includes the registration document characteristic vector reader processor 160 and the similarity calculator processor 161. The characteristic vector generator processor 170 is configured to call the characteristic word extractor processor 171 and the term frequency calculator processor 174. The characteristic word extractor processor 171 includes the document analyzer processor 172 and the compound characteristic word determiner processor 173.

The registration control processor 111 and the retrieval control processor 112 are activated by the system control processor 110 in response to an indication inputted by the user from the keyboard 101. The registration control processor 111 controls the registration document acquisition processor 120, the characteristic vector generator processor 170, and the registration document characteristic vector register processor 121. The retrieval control processor 112 controls the retrieval condition analyzer processor 130, the characteristic vector generator processor 170, the seeds document similarity calculator processor 131, and the retrieval result output processor 132.

It is assumed in the embodiment that the registration control processor 111 and the retrieval control processor 112 are activated by a command inputted from the keyboard 101. However, the processors 111 and 112 may also be activated by a command or an event inputted via another input device.

It is assumed that the program to implement the processors in the similar document retrieval system in this embodiment is stored in the magnetic disk device 103 on the floppy disk 107, or a recording medium, not shown in FIG. 1, such as a magnetooptical (MO) disk, a compact disk read-only memory (CD-ROM), or a digital video disk (DVD) and is read therefrom via a driver to be fed to the main memory 105 and is then executed by the CPU 102. However, the program may also be read via network 108 onto the main memory 105 to be executed by the CPU 102.

It is also assumed in the embodiment, that the registration document characteristic vector file 180 and the character word dictionary file 181 are stored in the magnetic disk device 103. However, the files 180 and 181 may also be stored on the floppy disk 107 or a recording medium, not shown in FIG. 1, such as a magnetooptical (MO) disk, a CD-ROM, or a DVD and is read therefrom via a driver to be fed to the main memory 105 for use thereof. Or, the files 180 and 181 may also be stored on a recording medium, not shown in FIG. 1, connected via the network 108 to another system. Alternatively, the files 180 and 181 may be stored on a recording medium directly connected to the network 108.

Next, description will be given of a processing procedure of the embodiment of a similar document retrieval system.

Figure 2:
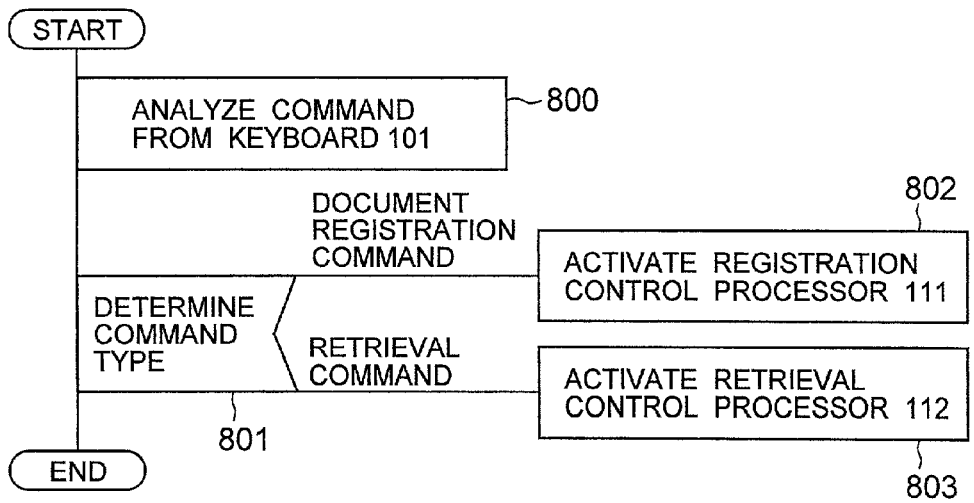
FIG. 2 is a flowchart showing operation of a system control processor 110 of the first embodiment.

FIG. 2 shows processing of the system control processor 110.

In step 800, the processor 110 analyzes a command inputted from the keyboard 101. If the command is a registration command as a result of the analysis, the system control processor 110 activates the registration control processor 111 in step 802 to register a document. If the command is a retrieval command as a result of the analysis, the system control processor 110 activates the retrieval control processor 112 in step 803 to register to retrieve a similar document. The processing procedure of the system control processor 110 has been described.

Figure 3:
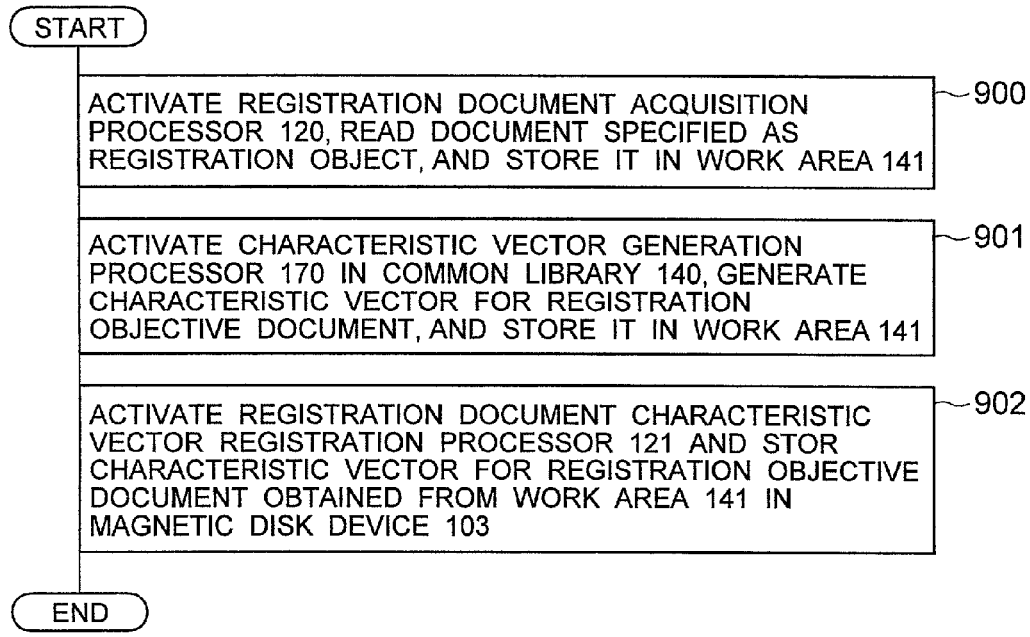
FIG. 3 is a flowchart showing operation of a registration control processor 111 of the first embodiment.

FIG. 3 shows processing of the registration control processor 111 activated in step 802 of FIG. 2.

In step 900, the processor 111 activates the registration document acquisition processor 120 to read a document (to be referred to as a registration objective document hereinbelow) specified as a document to be registered. The objective document is then stored in a work area 141.

Figure 22:
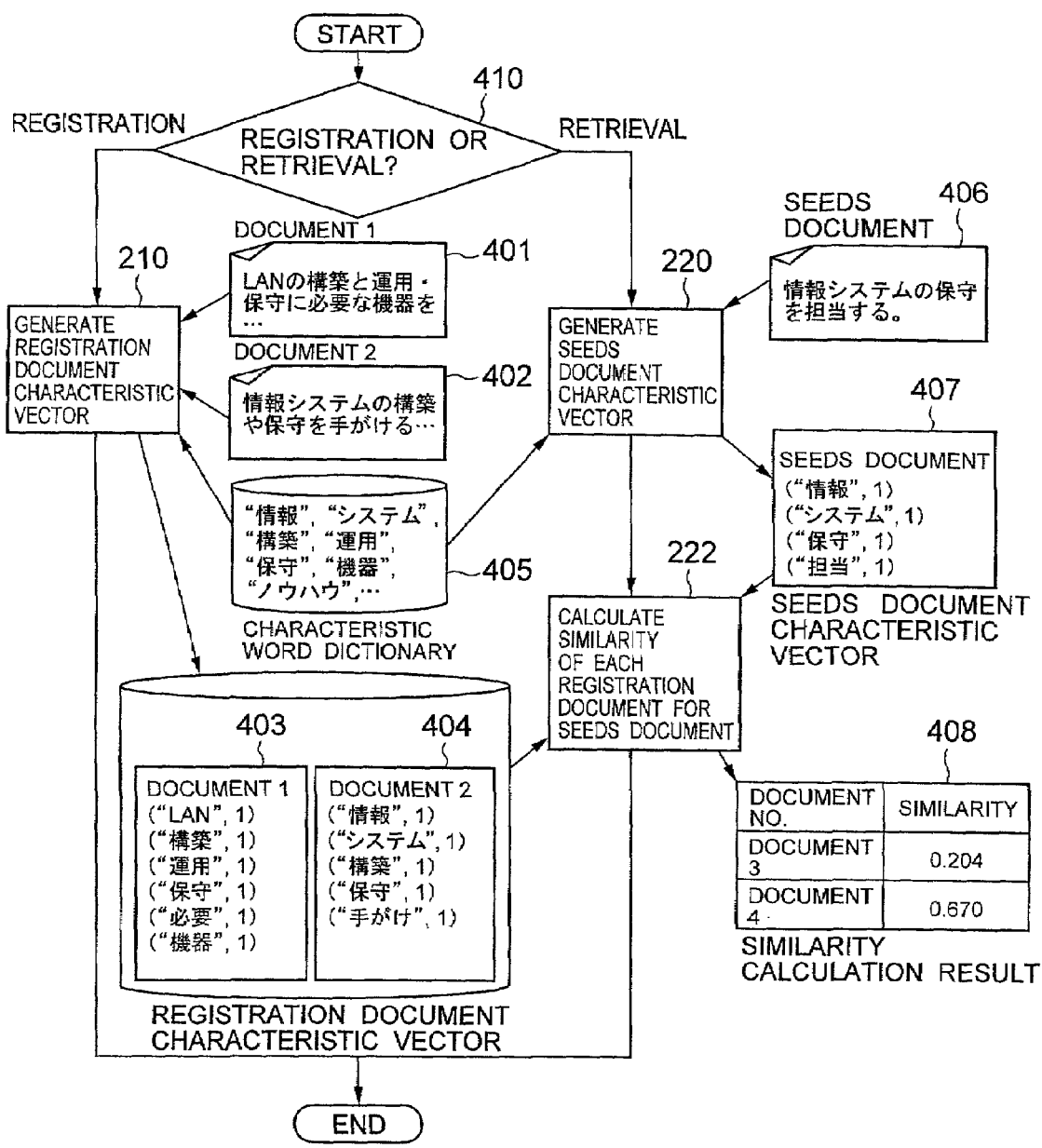
FIG. 22 is a diagram showing an outline of prior art technique 1.
Figure 23:
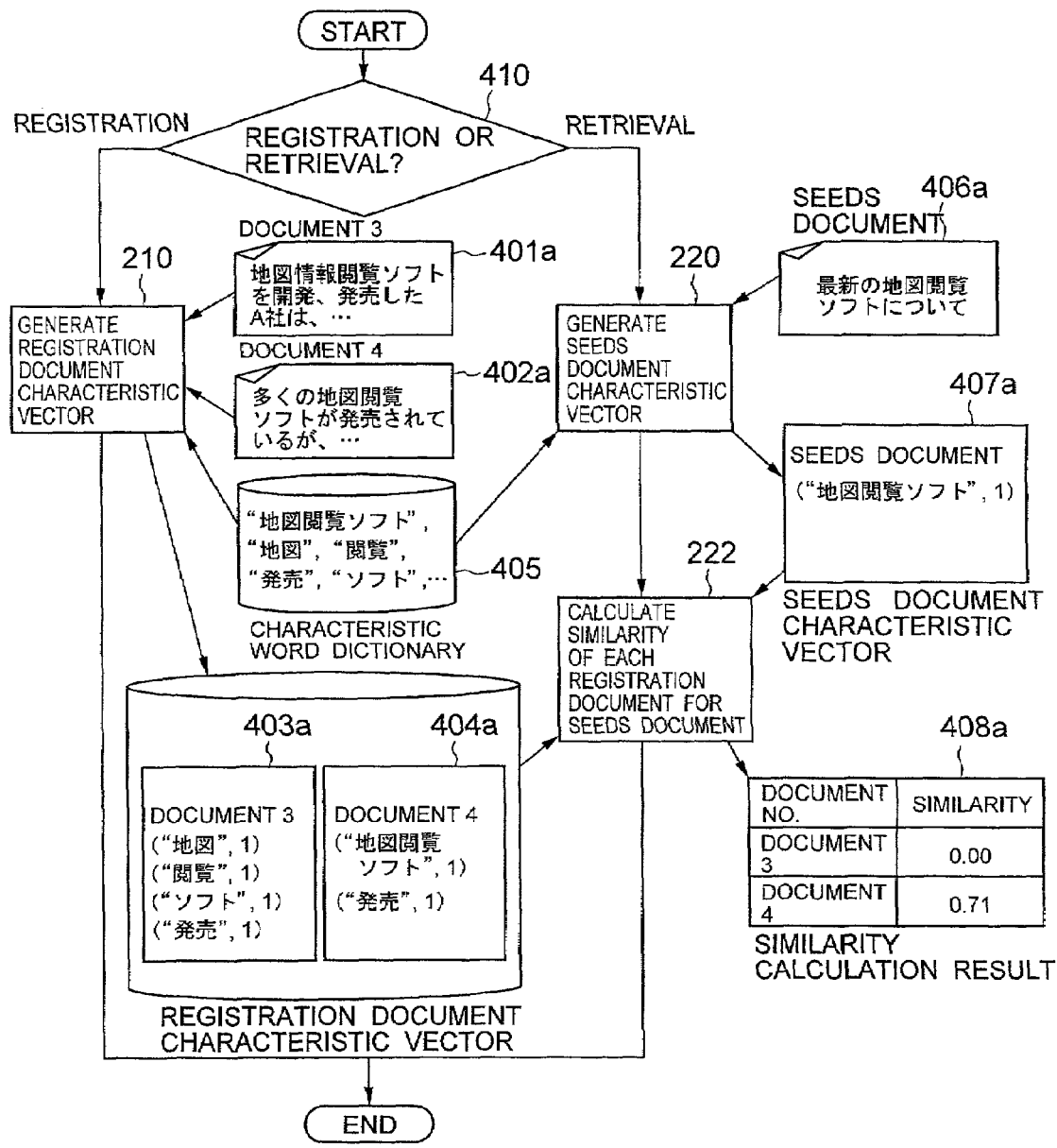
FIG. 23 is a diagram showing a problem of prior art technique 1.

In step 901, the registration control processor 111 activates the characteristic vector generation processor 170 stored in the common library 140 to generate a characteristic vector for the objective document in almost the same way as for the processing of FIG. 22. The characteristic vector is stored in the work area 141.

To generate the characteristic vector, an inverted document frequency or a value (frequency density) obtained by normalizing the value of the term frequency using the document length may be used in place of the term frequency value. Or, a combination of these values may also be employed.

In step 902, the registration control processor 111 activates the registration document characteristic vector register processor 121 to store the registration document characteristic vector onto the magnetic disk device 103. The processing procedure of the registration control processor 111 has been described.

Figure 4:
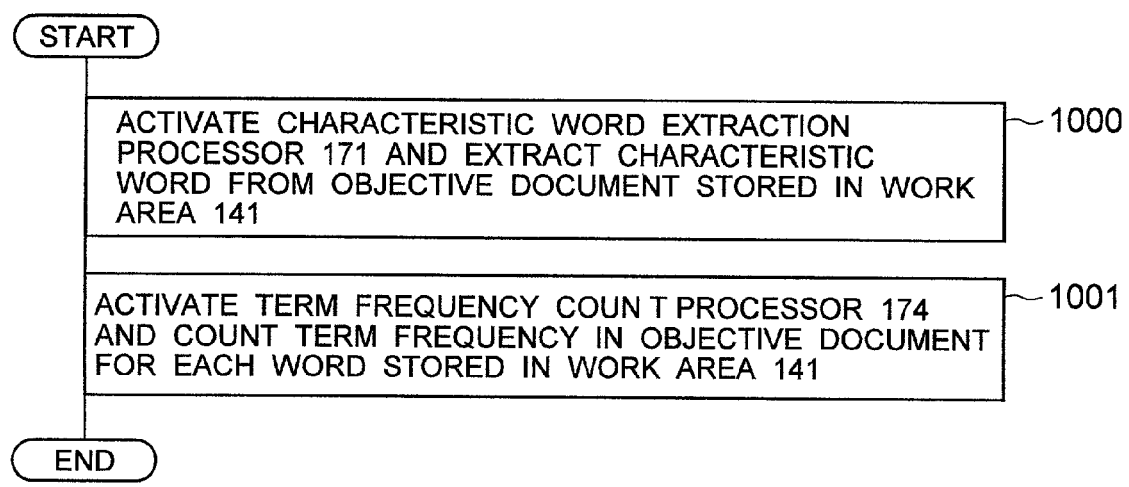
FIG. 4 is a flowchart showing operation of a characteristic vector generation processor 170 of the first embodiment.

FIG. 4 shows processing of the characteristic vector generation processor 170 activated in step 901 of FIG. 3.

In step 1000, the processor 170 activates the characteristic word extraction processor 171 to extract characteristic words from the objective document stored in the work area 141. In step 1001, the processor 170 activates the term frequency count processor 174 to count a term frequency of each characteristic word in the objective document stored in the work area 141. The processing procedure of the characteristic vector generation processor 170 has been described. Incidentally, the characteristic vector generation processor 170 is stored in the common library 140. Therefore, the processor 170 can be executed by the retrieval control processor in the document retrieval processing, which will be described later. The processor 170 is also used to generate a characteristic vector for a seeds document.

Figure 5:
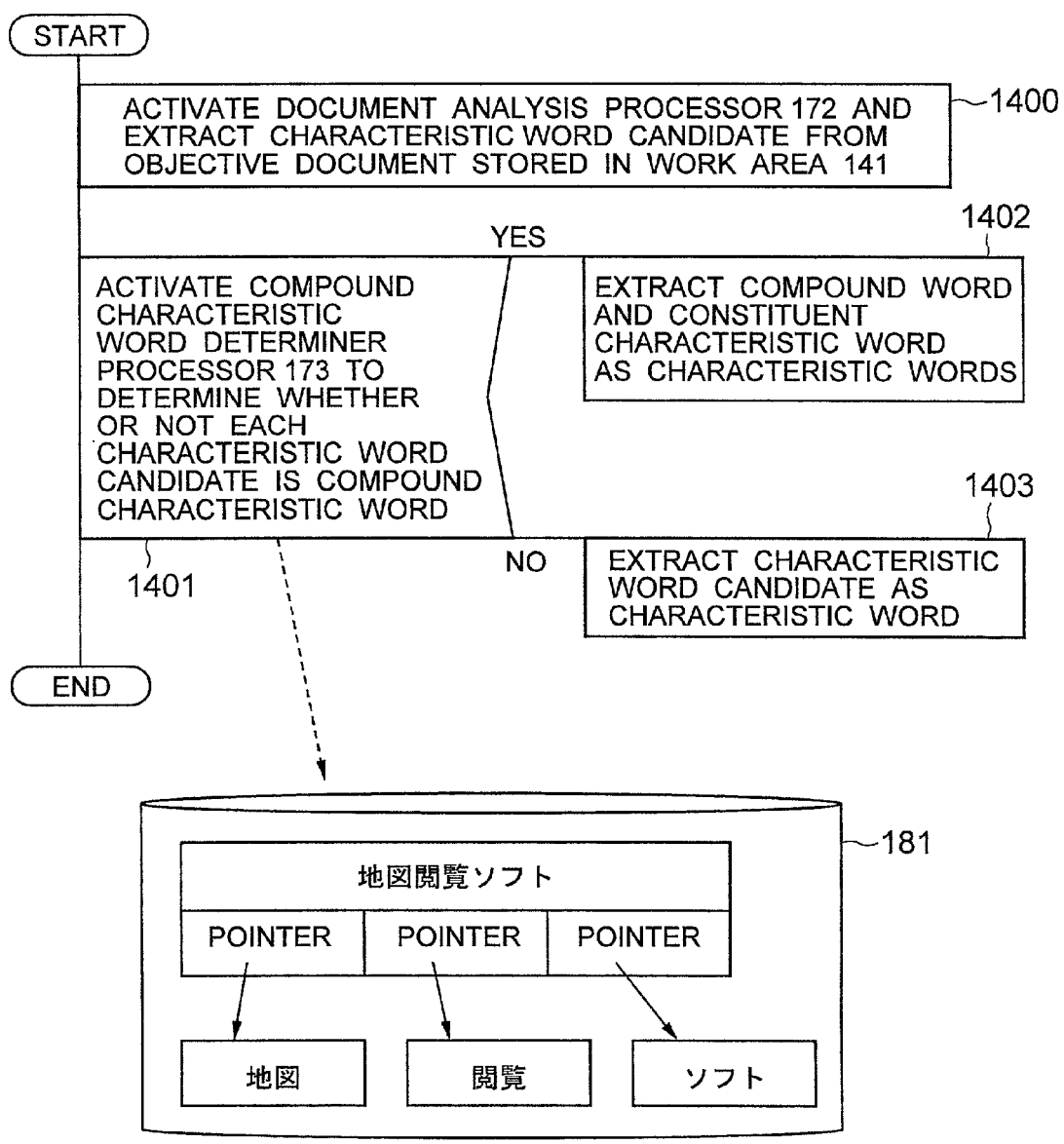
FIG. 5 is a diagram showing operation of a characteristic word extraction processor 171 of the first embodiment.

FIG. 5 shows processing of the characteristic word extraction processor 171 activated in step 1000 of FIG. 4.

In step 1400, the processor 171 activates the document analysis processor 172 to compare a character string in the objective document stored in the work area 141 with a characteristic word in the characteristic word dictionary file 181 and extracts from the objective document a character string matching the character word in the file 181 as a character word candidate.

In step 1401, the processor 171 activates the compound characteristic word determiner processor 173 to determine whether or not pointer information indicating a storage position of a constituent characteristic word has been registered to a characteristic word in the file 181 corresponding to the characteristic word candidate extracted in step 1400. If the pointer information has been registered, the character word extraction processor 171 determines that the characteristic word candidate is a compound characteristic word.

If it is determined that the characteristic word candidate is a compound characteristic word, the processor 171 executes step 1402 to read the characteristic word indicated by the pointer information, as a constituent characteristic word of the compound word. The processor extracts the compound characteristic word and the constituent characteristic word as characteristic words of the objective document.

In the embodiment, whether or not pointer information indicating a storage position of a constituent characteristic word has been registered to a characteristic word in the file 181 corresponding to the extracted characteristic word candidate is checked to determine whether or not the characteristic word candidate is a compound characteristic word. If this is the case, the constituent characteristic word is read using the pointer information. Therefore, the determination of the characteristic word candidate as the compound characteristic word and the readout of the constituent characteristic word can be conducted at a high speed. The pointer information indicating the constituent characteristic word is stored in the compound characteristic word in the embodiment. However, the dividing position may be stored in the compound characteristic word or the constituent word itself may be stored.

In step 1401, if the characteristic word candidate is other than a compound characteristic word, the characteristic word extraction processor 171 executes step 1403 to extract the characteristic word candidate as a characteristic word of the objective document. The processing procedure of the characteristic word extraction processor 171 has been described.

Figure 6:
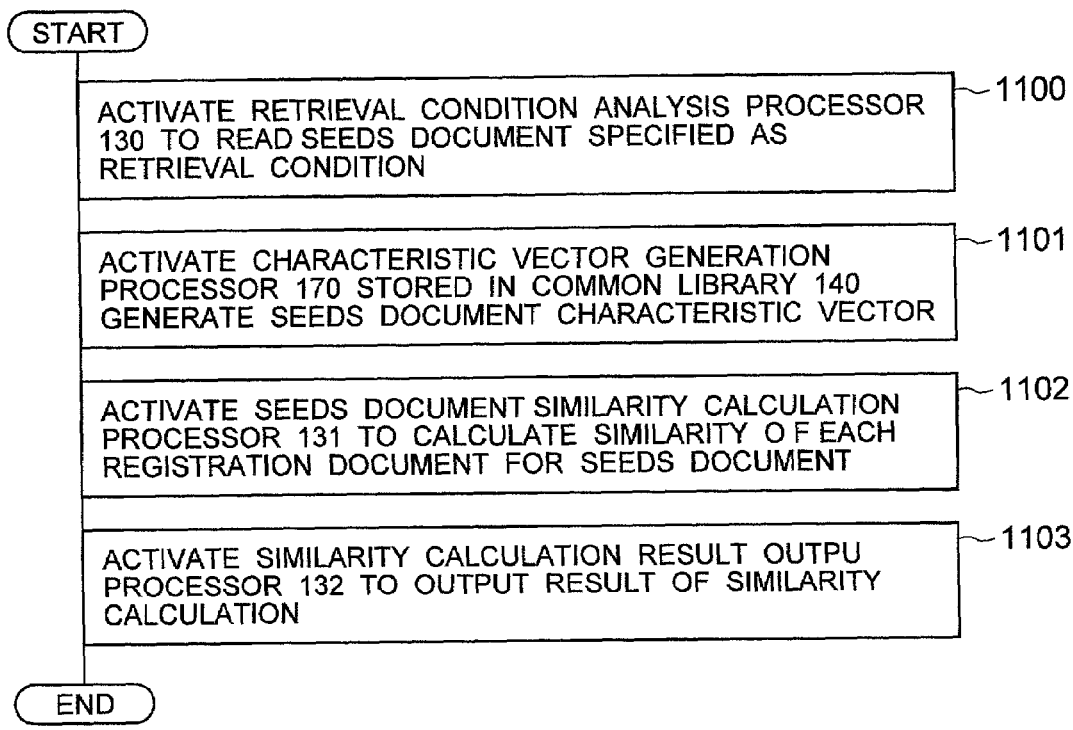
FIG. 6 is a flowchart showing operation of a retrieval control processor 112 of the first embodiment.

FIG. 6 shows processing of the retrieval control processor 112 activated in step 803 of FIG. 2.

In step 1100, the processor 112 activates the retrieval control processor 130 to acquire a seeds document specified as a retrieval condition. In step 1101, the processor 112 activates the characteristic vector generation processor 170 to generate a characteristic vector for the seeds document obtained in step 1100.

In step 1102, the processor 112 activates the seeds document similarity calculation processor 131 to calculate similarity of each registration document for the seeds document. In step 1103, the processor 112 activates the retrieval result output processor 132 to output as a retrieval result the similarity calculation result.

The retrieval result may be presented on the display 100 or stored in the work area 141 and the magnetic disk device 103. If the result of similarity calculation is to be presented on the display 100, the output items may be displayed in a descending order of similarity or in an ascending order or a descending order of a management number assigned to each document. The processing procedure of the retrieval control processor 112 has been described.

Figure 7:
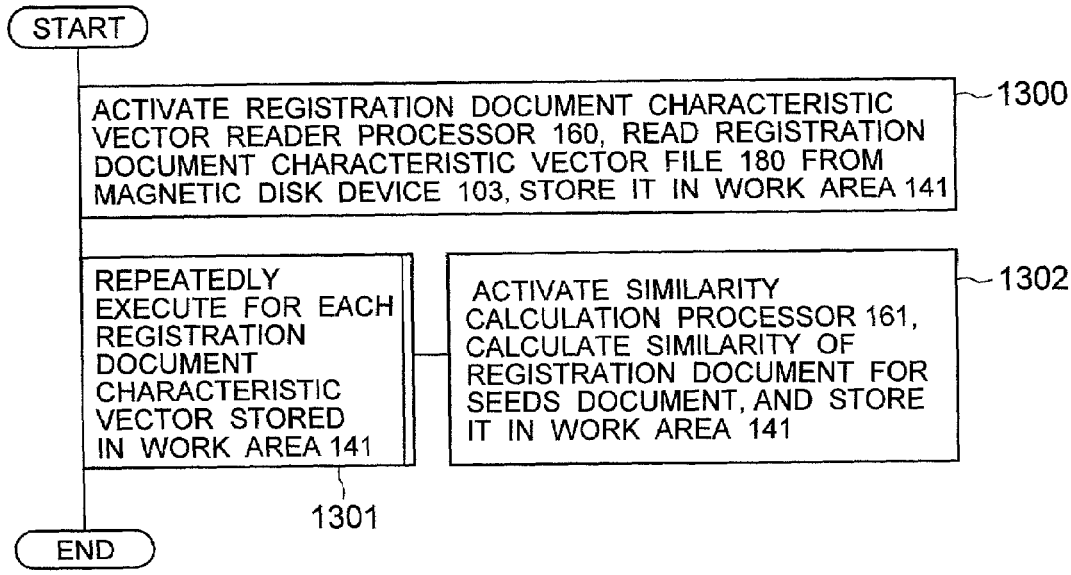
FIG. 7 is a flowchart showing operation of a seeds word similarity calculation processor 131 of the first embodiment.

FIG. 7 shows processing of the seeds document similarity calculation processor 131 activated in step 1102 of FIG. 6.

In step 1300, the processor 131 activates the registration document characteristic vector reader processor 160 to read the registration document characteristic vector file 180 from the magnetic disk device 103. The file 180 is stored in the work area 141.

In step 1301, the processor 131 repeatedly executes step 1302 for each registration document characteristic vector stored in the work area. In step 1302, the processor 131 activates the similarity calculator processor 161 to calculate according to expression (1) a cosine of an angle between the seeds document characteristic vector and the registration document characteristic vector. The resultant cosine is stored in the work area as similarity of the registration document for the seeds document. The processing procedure of the seeds document similarity calculation processor 131 has been described.

The similarity may be calculated as follows. For each word as an element of the characteristic vector, a score is calculated for each registration document. The scores for the respective words are added to each other to obtain the similarity.

Next, a concrete processing procedure of the embodiment of the similarity document retrieval system will be described by referring to FIGS. 8 to 11.

Figure 8:
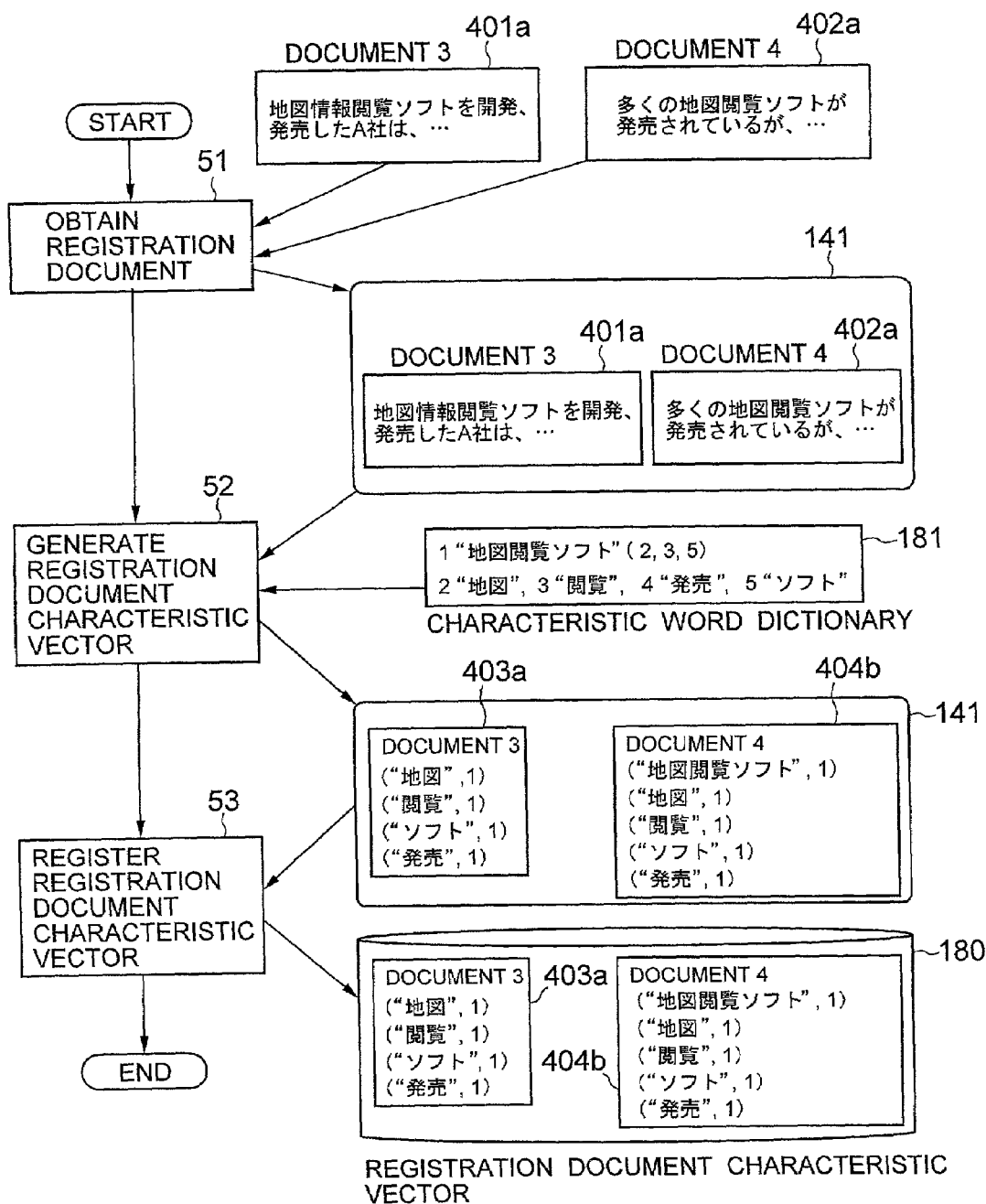
FIG. 8 is a flowchart showing operation of document registration processing in the first embodiment.

FIG. 8 shows a processing procedure of document registration processing in the embodiment. In the processing flow of FIG. 8, document 3 「地図情報閲覧 ソフトを開発発売したA社は...」 and document 4 「多くの地 図閲覧ソフトが発売され発売...」 are beforehand registered to the document database.

The characteristic word dictionary 181 includes a list of words which are extracted as characteristic words from a seeds document. If the characteristic word is a compound characteristic word, information of each constituent characteristic word is stored in the dictionary 181. FIG. 8 shows an example in which the dictionary 181 includes "閲覧", "地図", "閲覧", "ソフト", and "ソフト". In FIG. 8, 1"地図閲覧 ソフト" (2, 3, 5) indicates that the word number of "地図閲覧 ソフト? is "1". Since this is a compound characteristic word, word numbers 2, 3, and 5 respectively of "地図", "閲覧", and "ソフ" are stored in a form of pointer information (2, 3, 5).

In the embodiment of the similar document retrieval system, the registration document acquisition processor 120 reads objective documents, i.e., documents 3 and 4 to store the documents in work area (step 51). Thereafter, the characteristic vector generation processor 170 generates registration document characteristic vectors 403a and 404b respectively for documents 3 and 4 to store the vectors 403a and 404b in the work area 141 (step 52). The registration document characteristic vector registration processor 121 stores the registration document characteristic vectors 403a and 404b from the work area 141 in the registration document characteristic vector file 180 (step 53). Description has been given of the document registration processing in the embodiment of the similar document retrieval system.

Figure 9:
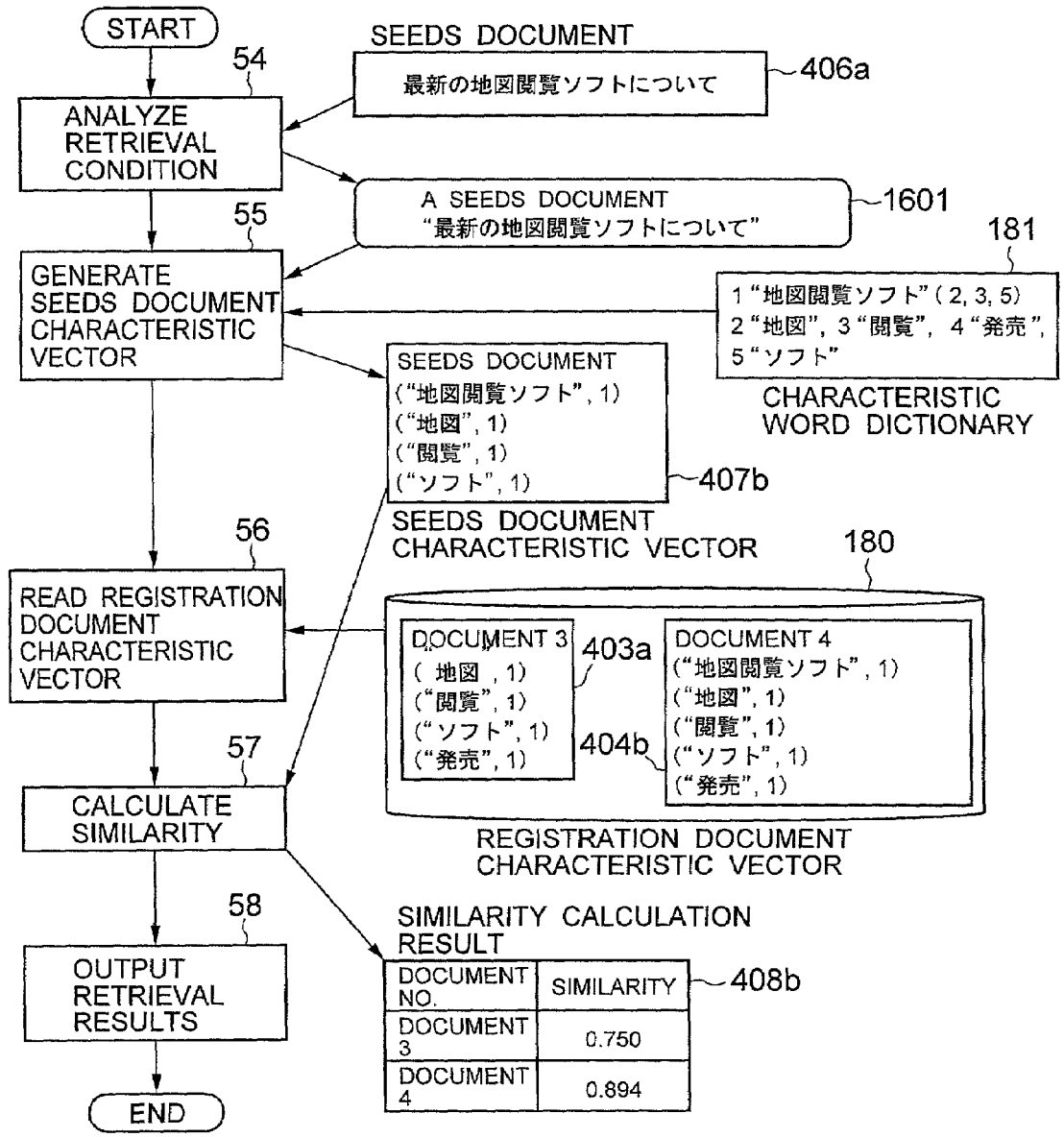
FIG. 9 is a flowchart showing operation of similar document retrieval processing in the first embodiment.

FIG. 9 shows a processing procedure of similar document retrieval processing in the embodiment. In this case, a seeds document "最新の地図閲 覧ソフトについて" 406a is inputted to the system.

First, the retrieval condition analyzer processor 130 is executed to obtain a seeds document specified as a retrieval condition. The seeds document is stored as a seeds document text 1601 in the work area 141 (step 54).

The characteristic vector generator processor 170 generates a seeds document characteristic vector 407b for the seeds document in the work area 141 and stores the vector 407b in the work area 141 (step 55).

Next, the registration document characteristic vector reader processor 160 reads the registration document characteristic vector file 180 generated by the document registration processing and stores the registration document characteristic vector vectors 403a and 404b in the work area 141 (step 56).

The similarity calculator processor 161 calculates, using expressions (6) and (7) as below, a cosine of an angle between the seeds document characteristic vector 407b and each of the registration document characteristic vector vectors 403a and 404b (step 57) to produce a result of similarity calculation for the registration documents with respect to the seeds document (step 58). The processing procedure of the similar document retrieval processing in the embodiment of the similar document retrieval system has been described.

$$\text{Similarity} = \frac{1 \times 0 + 1 \times 1 + 1 \times 1 + 1 \times 1}{\sqrt{1^2 + 1^2 + 1^2 + 1^2} \times \sqrt{1^2 + 1^2 + 1^2 + 1^2}} \quad (6)$$

$$= \frac{3}{2 \times 2} = 0.750$$

$$\text{Similarity} = \frac{1 \times 1 + 1 \times 1 + 1 \times 1 + 1 \times 1}{\sqrt{1^2 + 1^2 + 1^2 + 1^2} \times \sqrt{1^2 + 1^2 + 1^2 + 1^2 + 1^2}} \quad (7)$$

$$= \frac{4}{2\sqrt{5}} = 0.894$$

Figure 10:
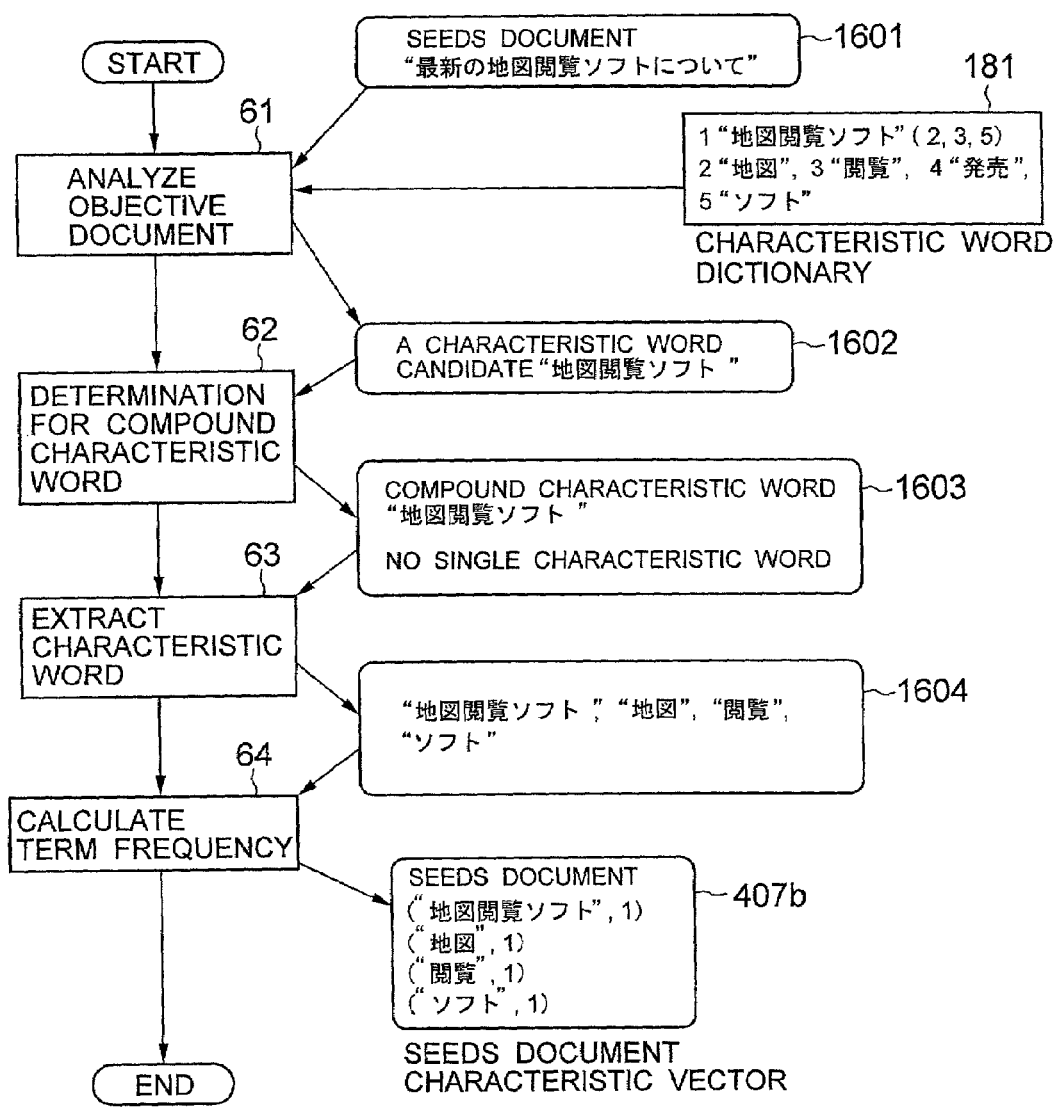
FIG. 10 is a flowchart showing operation of characteristic vector generation in the first embodiment.

FIG. 10 shows a processing procedure of characteristic vector generation processing in the embodiment. In the procedure, a seeds document "最新の地 図閲覧ソフトについて" is inputted and a characteristic vector is accordingly generated.

First, the document analyzer processor 172 compares a term or word string in the seeds document 1601 "最新の地図閲覧 ソフトについて" stored as an objective document in the work area 141 with the characteristic word in the characteristic word dictionary file 181 to detect a term string "地図閲覧ソフト" matching the characteristic word in the file 181 and extracts the term string as a characteristic word candidate 1602 from the seeds document 1601 (step 61).

The compound characteristic word determiner processor 173 determines whether or not pointer information indicating a storage position of a constituent characteristic word has been registered to the term string "地図閲覧ソフト" in the file 181. The processor resultantly determines whether or not the characteristic word candidate 1602 "地図閲覧ソフト" is a compound characteristic word. If the pointer information has been registered, the processor 173 assumes that the characteristic word candidate 1602 "地図閲覧ソフト 地図閲覧ソフト" includes a plurality of characteristic words "地図", "閲覧",and "ソフト", namely, the candidate 1602 is a compound characteristic word (step 62).

Subsequently, using the pointer information, the characteristic word extraction processor 171 extracts constituent characteristic words 1604 "地図", "閲覧", and "ソフト" from "地図閲覧ソフト" determined as a compound characteristic word by the processor 173 (step 63). For each characteristic word extracted by the processor 171, the frequency counter processor 174 calculates a term frequency thereof in the seeds document 1601 to output the characteristic word and its frequency as a characteristic vector 407b (step 64). The processing procedure of the characteristic vector generation processing in the embodiment of the similar document retrieval system has been described.

In the embodiment, to calculate similarity, a compound characteristic word and its constituent characteristic words are used as elements of the characteristic vector. Resultantly, the similar document retrieval can be conducted to retrieve similar documents including the word string "地図閲覧ソフト" as in a document retrieval under the longest matching condition, and a high-precision similar document retrieval can be achieved without missing similar documents.

Although the objective document and the seeds document are documents in the embodiment, a sentence or a character or term string may be used as the objective document and the seeds document. In the characteristic vector generation processing, a compound characteristic word and all constituent words of the compound characteristic word are entirely extracted as characteristic words in the embodiment. However, part of the constituent words of the compound characteristic word may also be extracted. In this case, the constituent words to be extracted may be specified such that only the constituent words of which an inverted document frequency (IDF) described in an article of prior art technique 1 exceeds a predetermined threshold value. Or, it is also possible to extract only the constituent word at a specified position in the compound characteristic word, for example, at a first or last position of the compound characteristic word.

In the embodiment, the characteristic vector is beforehand prepared for the registration document. However, it is also possible to generate an index for content search at registration of a document such that in a document retrieval operation, a term frequency of each objective document is obtained by referring to the content search index to thereby calculate similarity. Although the characteristic words are extracted by referring to the characteristic word dictionary in the embodiment, it is also possible to use, for example, a technology in which the characteristic words are extracted without using any dictionary.

For example, according to a technology described in JP-A-11-338883 corresponding to U.S. application Ser. No. 09/320,558, the disclosure of which is incorporated herein by reference, when a character string of one character type can be divided into substrings, the character string is assumed as a compound word and the substrings are regarded as constituent characteristic words thereof to constitute a characteristic vector.

Although the example of the embodiment is a similar document retrieval system for the Japanese language, the present invention is also applicable to a similar document retrieval system for other languages. That is, in the Japanese similar document retrieval system, a compound characteristic word appearing in a seeds document and its constituent characteristic words are used to calculate similarity. This leads to similar document retrieval without missing similar documents. For a language such as English having a clear boundary between words, it is possible to apply the embodiment to a retrieval in which a set of a plurality of words generally called "phrase" or "idiom" is regarded as a compound characteristic word such that a phrase or an idiom is used for the retrieval operation.

As a result, also in other then the Japanese language, similarity can be calculated in consideration of the contents of a set of words related to each other with respect to meaning thereof. It is therefore possible to provide a similar document retrieval for many languages in which missing similar documents are minimized.

Figure 11:
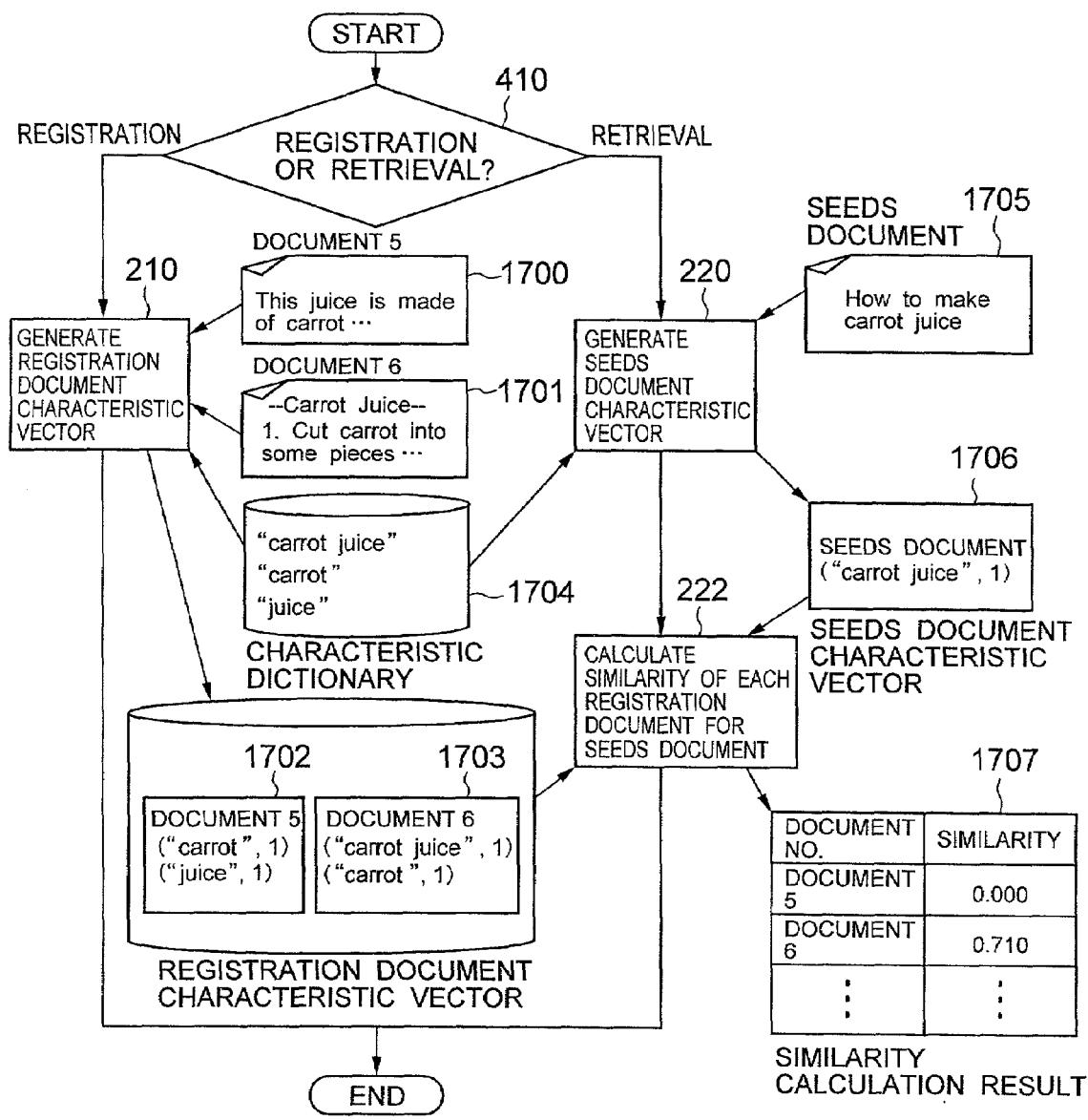
FIG. 11 is a diagram showing a problem appearing when prior art technique 1 is applied to an English similar document retrieval system.

Referring now to FIG. 11, description will be given of a problem when prior art technique 1 is applied to a similar document retrieval system for English.

FIG. 11 shows a problem taking place when prior art technique 1 is applied to an English similar document retrieval system. In this example, a seeds document "How to make carrot juice" is inputted to a document database to which document 5 "This juice is made of carrot . . . " and document 6 "-- Carrot Juice -- 1. Cut carrot into some pieces . . . " have been registered. A characteristic word dictionary 1704 contains words which are to be extracted from the seeds document.

First, document registration processing is executed in step 210 to generate registration document characteristic vectors 1702 and 1703. In the example of FIG. 11, "document5 ("carrot",1) ("juice",1) is generated as the characteristic vector 1702 and "document6 ("carrot juice",1) ("carrot",1)" is generated as the characteristic vector 1703.

Next, step 220 is executed to retrieve a similar document and a seeds document characteristic vector 1706 is generated for a seeds document 1705. In the example, "seeds document ("carrot juice",1)" is generated as the seeds document characteristic vector 1706.

In step 222, similarity of each registration document is calculated for the seeds document. As a result, a similarity calculation result 1707 is outputted. In the example of FIG. 11, similarity values are respectively calculated as 0.000 and 0.710 for documents 5 and 6 as below.

$$\text{Similarity} = \frac{1 \times 0}{\sqrt{1^2} \times \sqrt{1^2 + 1^2}} \tag{8}$$
$$= \frac{0}{\sqrt{2}} = 0.000$$

$$\text{Similarity} = \frac{1 \times 1}{\sqrt{1^2} \times \sqrt{1^2 + 1^2}} \tag{9}$$
$$= \frac{1}{\sqrt{2}} = 0.710$$

Resultantly, although the contents of document 3 are related to the seeds document, the calculation result of prior art technique 1 disadvantageously indicates that document 3 is not related to the seeds document at all.

This occurs as follows. Although a characteristic word extracted as an element of the seeds document characteristic vector includes a set of plurality of words, only the characteristic word is utilized as the element of the characteristic vector in the similarity calculation. Therefore, the concept of each word constituting the characteristic word is not reflected in the similarity.

In other words, when a set of words "carrot juice" or the like is employed as a characteristic word, for example, to reduce noise, precision of the retrieval for document 6 including "carrot juice" is improved and the registration documents not including "carrot juice" are not retrieved. Similarity is not assigned to document 5 as a registration document containing each word of the characteristic word, and hence document 5 is not retrieved.

Also when prior art technique 1 is applied to an English similar document retrieval system, a problem similar to that taking place in the Japanese similar document retrieval system disadvantageously occurs. As in the Japanese similar document retrieval system, the problem can be similarly removed by applying the embodiment to the English similar document retrieval system.

Figure 12:
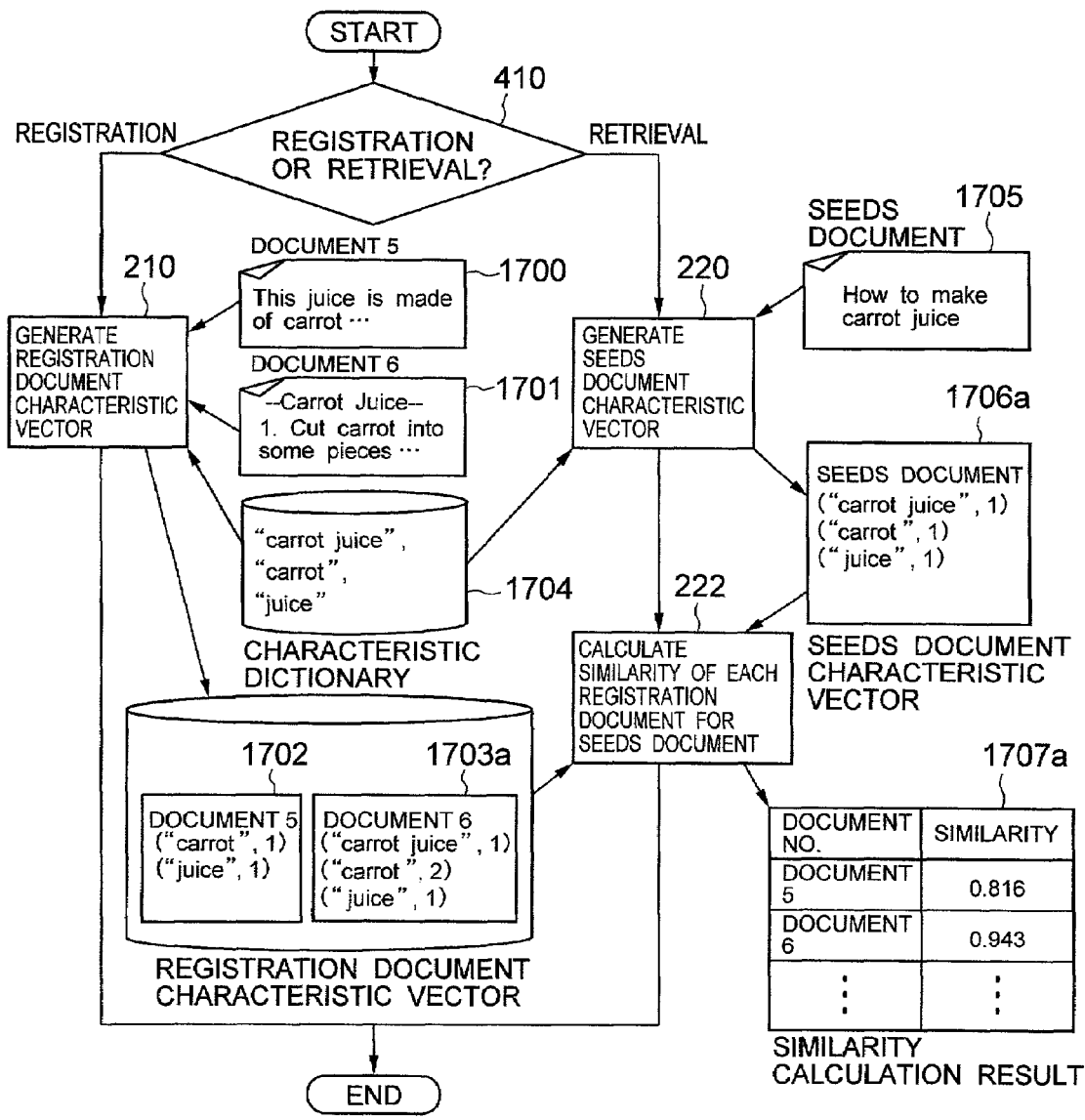
FIG. 12 is a diagram showing an outline of processing in a first embodiment of an English similar document retrieval system.

FIG. 12 shows an outline of processing in an English similar document retrieval system to which the embodiment is applied.

In the example of FIG. 12, a seeds document "How to make carrot juice" is inputted to a document database to which document 5 "This juice is made of carrot . . . " and document 6 "-- Carrot juice -- 1. Cut carrot into some pieces . . . " have been registered.

In step 210, the system first produces characteristic vectors 1702 and 1703 respectively corresponding to documents 5 and 6. In the example, "document 5 ("carrot",1) ("juice", 1)" is generated as the vector 1702 for document 5 and "document 6 ("carrot juice",1) ("carrot",2) ("juice",1)" is generated as the vector 1703 for document 6.

Next, a character vector 1706a is generated for the seeds document in step 220. In the example, "seeds document ("carrot juice",1) ("carrot",1) ("juice",1)" is generated as the vector 1706*a* for the seeds document.

In step 222, similarity of each registration document is calculated for the seeds document. A similarity calculation result 1707*a* is outputted as a result. In the example, similarity values of 0.816 and 0.943 are obtained in the expressions (10) and (11) for documents 5 and 6, respectively as below.

$$\text{Similarity} = \frac{1 \times 0 + 1 \times 1 + 1 \times 1}{\sqrt{1^2 + 1^2 + 1^2} \times \sqrt{1^2 + 1^2}} \quad (10)$$
$$= \frac{2}{\sqrt{3} \times \sqrt{2}} = 0.816$$

$$\text{Similarity} = \frac{1 \times 1 + 1 \times 2 + 1 \times 1}{\sqrt{1^2 + 1^2 + 1^2} \times \sqrt{1^2 + 1^2 + 1^2}} \quad (11)$$
$$= \frac{4}{\sqrt{3} \times \sqrt{6}} = 0.943$$

Description has been given of an outline of processing of an English similar document retrieval system to which the embodiment is applied. As described above, also in the English similar document retrieval system to which the embodiment is applied, document 5 which cannot be retrieved in prior art technique 1 can be retrieved by taking a compound characteristic word into consideration.

According to the embodiment of the similar document retrieval system described above, since a document containing a compound characteristic word and its constituent characteristic words is retrieved as a similar document, there can be implemented a high-precision similar document retrieval system without any missing similar documents. It is also possible to retrieve with high precision a document including the contents particularly associated with those of a seeds document.

(Second Embodiment)

Description will be given of a second embodiment of a similar document retrieval system using a weighting procedure in consideration of a term appearance distance or term distance in a registration document of each constituent characteristic word extracted from a compound characteristic word.

In the embodiment, a high value of similarity is assigned to a registration document in which a plurality of constituent characteristic words extracted from one compound characteristic word of a seeds document which are highly related to each other appear in a short distance. Therefore, a registration document including the contents more similar to the seed document can be retrieved with high precision.

In the second embodiment substantially similar in constitution to the first embodiment of FIG. 1, the characteristic vector generator processor 170 and the seeds document similarity calculator generator 131 of the first embodiment are different from those of the first embodiment. In the second embodiment, a characteristic vector generator processor 170*a* includes a term position acquisition processor 1900 and a seeds document similarity calculator generator 131*a* includes a weighting coefficient calculator processor 2000 as shown in FIG. 14.

Figure 13:
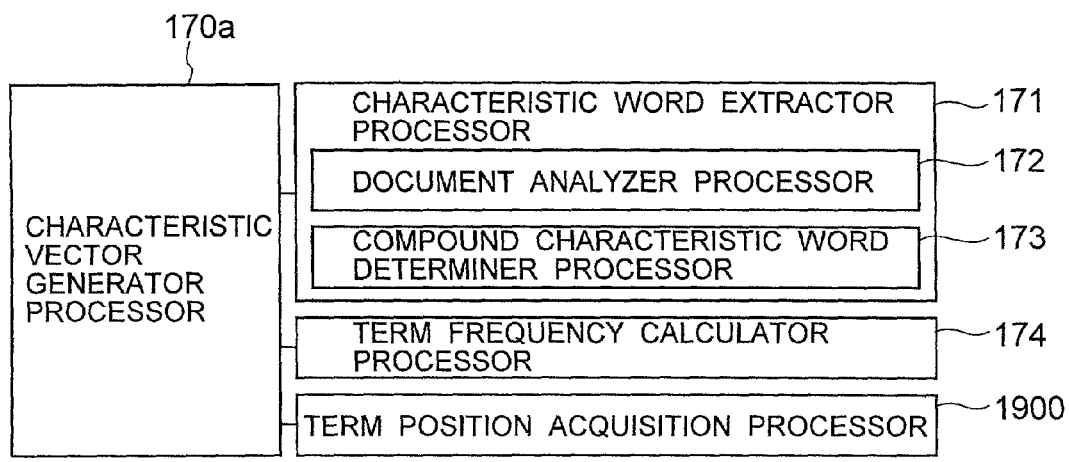
FIG. 13 is a block diagram showing constitution of a characteristic vector generation processor 107a in a second embodiment.

The term position acquisition processor 1900 of FIG. 13 is a processor to acquire a term appearance position in an objective document for each characteristic word obtained by the characteristic word acquisition processor 171.

Figure 14:
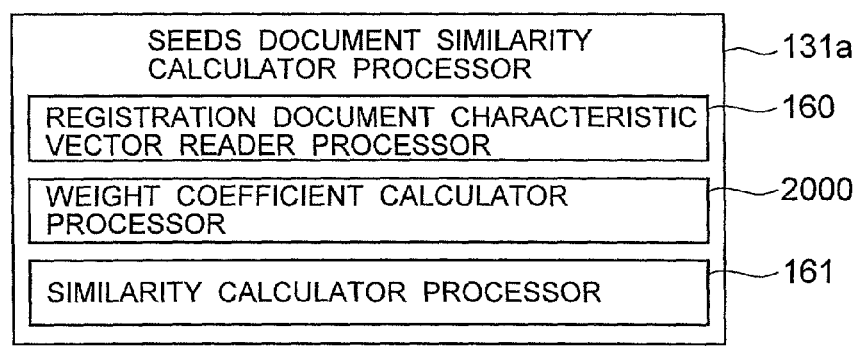
FIG. 14 is a diagram showing constitution of a seeds word similarity calculation processor 170a in the second embodiment.

The weighting coefficient calculator processor 2000 of FIG. 14 is a processor to calculate a weighting coefficient, for each characteristic word of a registration document matching a compound characteristic word extracted from a seeds document, according to a distance between the characteristic word and another constituent characteristic word extracted from the compound characteristic word.

Assume that a program which implements the appearance position acquisition processor 1900 and the weighting coefficient calculator processor 2000 in the similar document retrieval system is recorded on a recording medium such as a CD-ROM and is then stored on a magnetic disk or the like to be thereafter loaded in the system for execution thereof. The program may also be stored on a recording medium other than a CD-ROM. The program may be installed from the recording medium in an information processor for use thereof. Or, the program may be obtained from the recording medium via a network.

Figure 15:
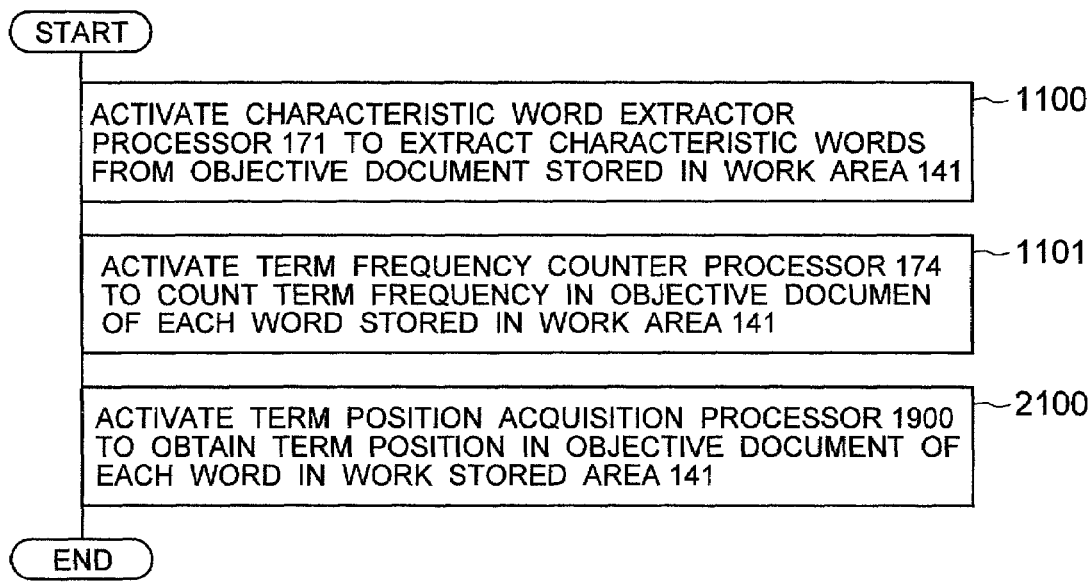
FIG. 15 is a flowchart showing operation of a characteristic vector generation processor 170a of the second embodiment.

FIG. 15 shows a processing procedure of the characteristic vector generator processor 170*a* of the embodiment. This differs from that of the characteristic vector generator processor 170 of the first embodiment shown in FIG. 4 only in that a term position acquisition step 2100 is additionally employed. The other processing steps are the same as those described above in conjunction with FIG. 4.

In the term position acquisition step 2100, the term position acquisition processor 1900 is activated to acquire, for each word stored in the work area 141, a term appearance position in the objective document by counting character positions relative to a first character of the objective document.

Figure 16:
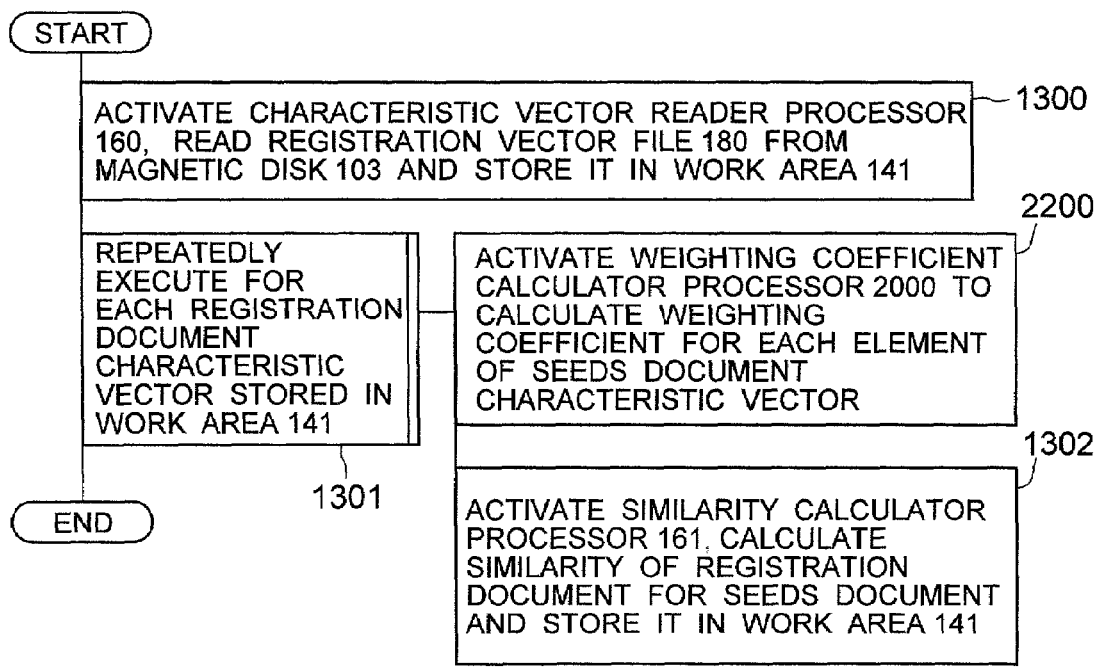
FIG. 16 is a flowchart showing operation of a seeds word similarity calculation processor 131a of the second embodiment.

FIG. 16 shows a processing procedure of the seeds document similarity calculator processor 131*a* in the embodiment. The processor 131*a* differs from the seeds document similarity calculator processor 131 in the first embodiment shown in FIG. 7 only in that a weighting coefficient calculator step 2200 is additionally used. The other processing steps are the same as those described above in conjunction with FIG. 7.

In step 2200, the weight coefficient calculator processor 2000 is activated to calculate a weight coefficient for a set of constituent characteristic words extracted each element of the seeds document characteristic vector, the characteristic words belonging to one compound characteristic word, and the coefficient is multiplied by the elements of the seeds document characteristic vector.

Figure 17:
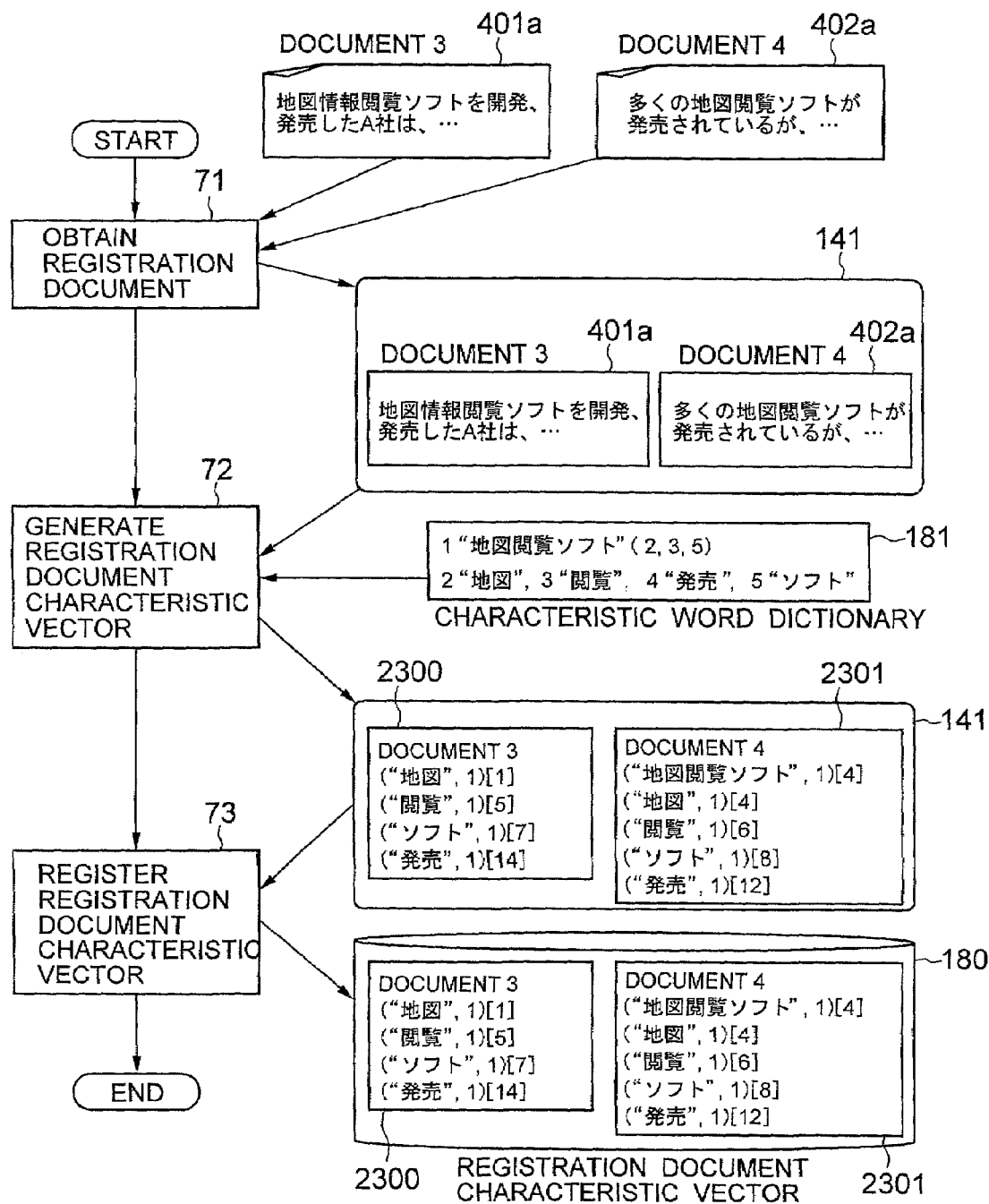
FIG. 17 is a flowchart showing operation of document registration processing in the second embodiment.
Figure 18:
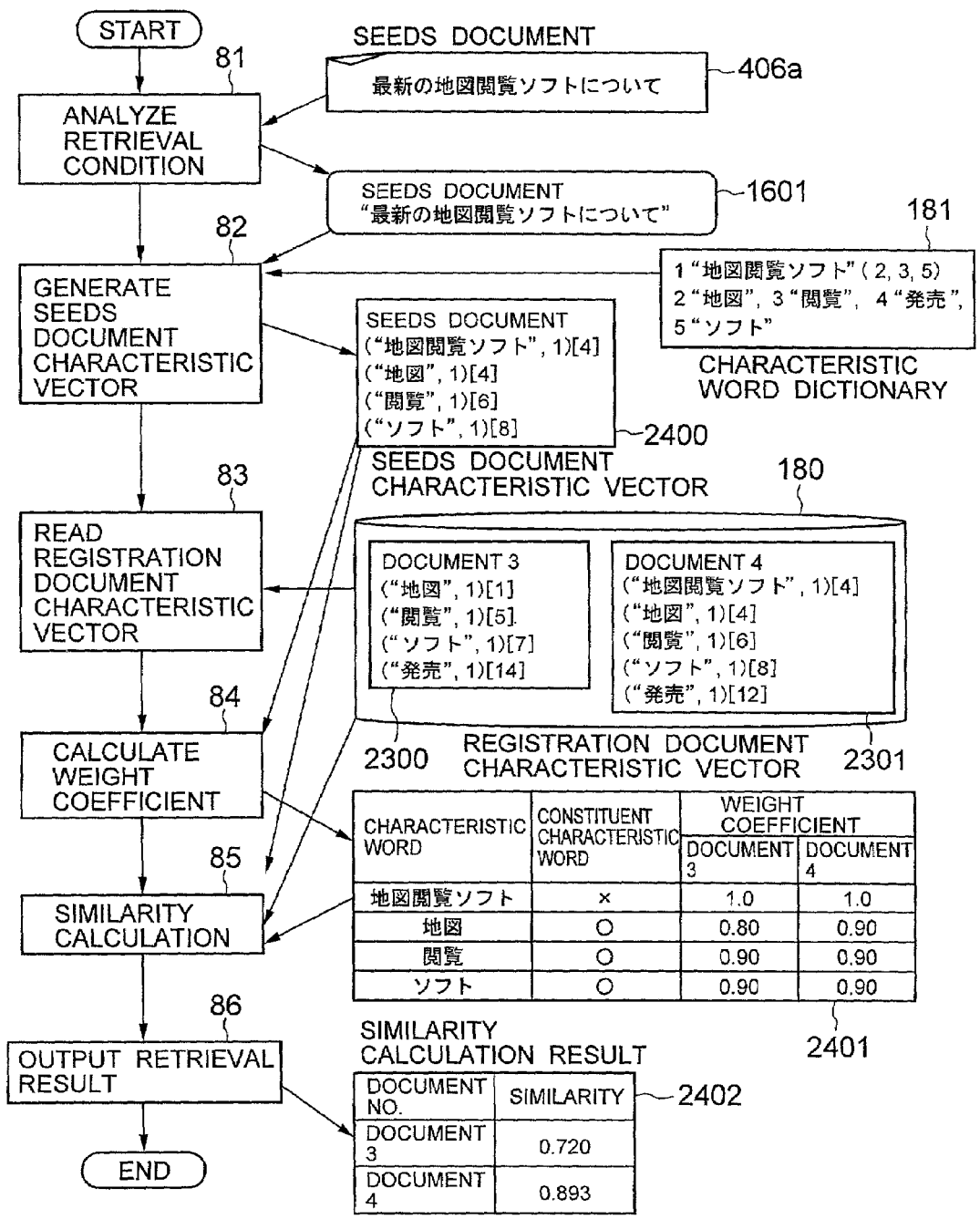
FIG. 18 is a flowchart showing operation of similar document retrieval processing in the second embodiment.
Figure 19:
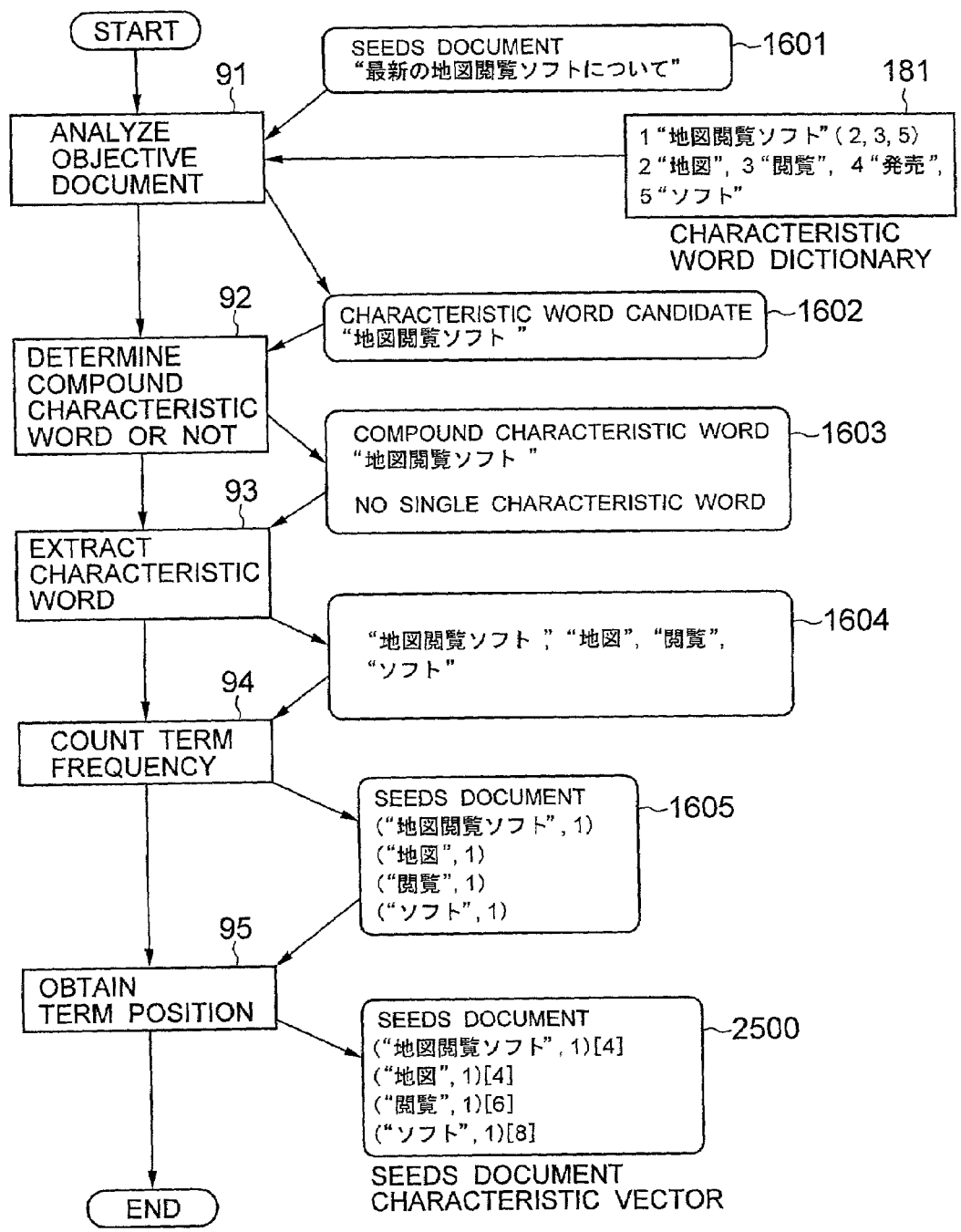
FIG. 19 is a flowchart showing operation of characteristic vector generation in the second embodiment.
Figure 20:
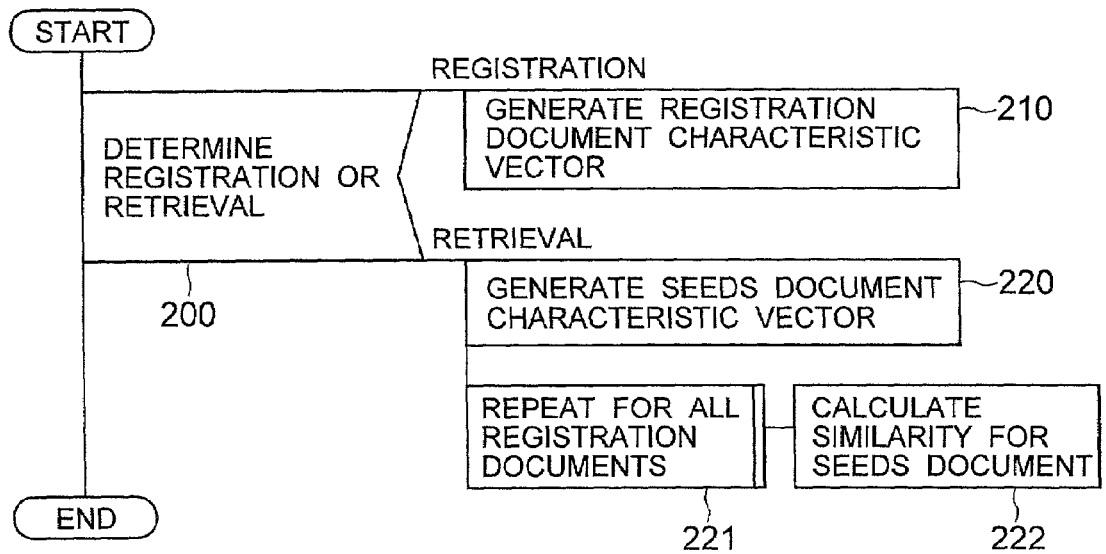
FIG. 20 is a flowchart showing an example of a processing procedure of prior art technique 1.
Figure 21:
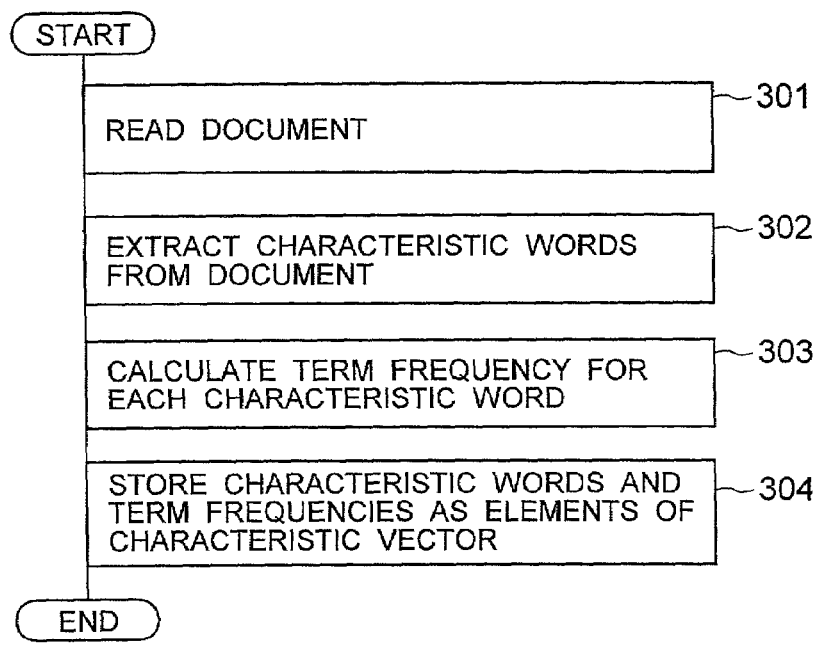
FIG. 21 is a flowchart showing an example of characteristic vector generation in prior art technique 1.

Referring now to FIGS. 17 to 19, description will be given of a concrete processing procedure in the embodiment of the similar document retrieval system.

FIG. 17 shows a general flow of document registration processing in the embodiment. In the processing flow, document 3 「地図情報閲覧ソフトを開発 発売したA社は. . . 」 and document 4 「多くの地図閲覧 ソフトが発売されているが. . . 」 are registered to a document database.

The registration document acquisition processor 120 first reads and stores documents 3 and 4 in the work area 141 (step 71). The characteristic vector generator processor 170*a* then generates registration document characteristic vectors 2300 and 2301 respectively for the objective documents 3 and 4 and stores the vectors 2300 and 2301 in the work area 141 (step 72).

In the example shown in FIG. 17, "document 3 ("地図",1) [1], ("閲覧",1) [5], ("ソフト",1) [7], ("発売",1) [14]" is generated as the vector 2300 for document 3 and "document 4 ("地図閲覧ソフト",1) [4] ("地図",1) [4], ("閲覧",1) [6], ("ソフト",1) [8], ("発売",1) [12]" is generated as the vector 2301 for document 4. In the vector description ("地図",1) [1], "1" between the parentheses indicates that the characteristic word "地図" appears once and "1" between the brackets indicates that the characteristic word "地図" is at a character position of "1".

In the example of FIG. 17, the numeric value indicating a character position indicates a position relative to the first character position in a sentence. However, the numeric value may also indicate a word position relative to the first word in a sentence.

The characteristic vector register processor 121 stores the registration document characteristic vectors from the work area 141 in a registration document characteristic vector file 180 (step 73).

FIG. 18 shows a processing procedure of similar document retrieval processing in the embodiment. A seeds document 「最新の地図閲覧 ソフトについて」 406a is inputted in the example of FIG. 13. The retrieval condition analyzer processor 130 first obtains a seeds document specified as a retrieval condition and stores the document in the work area 141 (step 81).

The characteristic vector generator processor 170a generates a characteristic vector 2400 for the seeds document stored in the work area 141 and stores the vector 2400 in the work area 141 (step 82).

Subsequently, the registration document characteristic vector reader processor 160 reads the characteristic vector file 180 generated in the registration processing and stores the registration document characteristic vectors 2300 and 2301 in the work area 141 (step 83).

The weight coefficient calculator processor 2000 determines whether or not each element of the vector 2400 is a constituent characteristic word. If this is the case, the processor 2000 calculates a weight using expression (12) and outputs the resultant value as a weight coefficient 2401 (step 84).

$$\text{Weight coefficient of constituent characteristic word } A \text{ of seeds document characteristic vector} = 1 - \frac{\text{Min}(C; \text{Minimum distance to constituent characteristic word of same source})}{C} \quad (12)$$

where, C is an allowable maximum distance.

In the example of FIG. 18, a weight is calculated for each element according to expression (12) with constant C=20. That is, since an element "地図" of the vector 2400 is a constituent characteristic word of the compound characteristic word "地図閲覧ソフト", a minimum distance is obtained from distances between "地図" and the other constituent characteristic words "閲覧" and "ソフト", which will be referred to as "constituent characteristic words from same source" hereinbelow, of the compound characteristic word "地図閲覧ソフト".

The distance is defined as a difference between word positions respectively of two words in a document. In document 3, "地図" is at a position of "1", "閲覧" is at a position of "5", "ソフト" is at a position of "7". Therefore, the distance between "地図" and "閲覧" is "4" and that between "地図" and "ソフト" is "6". Therefore, the minimum distance is "4" and hence a weight coefficient of "0.80" is obtained.

In the similarity calculator processor 161, a cosine of an angle between the seeds document characteristic vector 2400 generated in step 170a and each of the registration document characteristic vectors 2300 and 2301 is calculated using the weight coefficient 2401 as below (step 85).

$$\text{Weighted similarity}(j) = \frac{\sum_i (w_{ij} \times TD_{ij} \times TQ_i)}{\sqrt{\sum_i (W_{ij} \times TD_{ij})^2 \times \sum_i TQ_i^2}} \quad (12a)$$

In expression (12a), a weight coefficient and a term frequency of an i-th word in registration document j are indicated as $W_{ij}$ and $TD_{ij}$, and a term frequency of an i-th word in the seeds document is indicated as $TQ_i$. In the example of FIG. 18, the cosine of an angle between the characteristic vectors 2400 and 2300 and that between the characteristic vectors 2400 and 2301 are calculated in the expressions (13) and (14) as follows. These values are outputted as a similarity calculation result 2402 (step 86).

$$\text{Similarity} = \frac{1 \times 1 \times 0 + 0.8 \times 1 \times 1 + 0.9 \times 1 \times 1 + 0.9 \times 1 \times 1}{\sqrt{(1 \times 1)^2 + (0.8 \times 1)^2 + (0.9 \times 1)^2 + (0.9 \times 1)^2} \times \sqrt{1^2 + 1^2 + 1^2 + 1^2}} \quad (13)$$

$$= \frac{2.6}{\sqrt{3.26} \sqrt{4}} = 0.720$$

$$\text{Similarity} = \frac{1 \times 1 \times 1 + 0.9 \times 1 \times 1 + 0.9 \times 1 \times 1 + 0.9 \times 1 \times 1}{\sqrt{(1 \times 1)^2 + (0.9 \times 1)^2 + (0.9 \times 1)^2 + (0.9 \times 1)^2} \times \sqrt{1^2 + 1^2 + 1^2 + 1^2 + 1^2}} \quad (14)$$

$$= \frac{3.7}{\sqrt{3.43} \sqrt{5}} = 0.893$$

FIG. 19 shows a processing procedure of characteristic vector generation processing in the embodiment. In the example of FIG. 19, characteristic vectors are generated when a seeds document 「最新の地図閲 覧ソフトについて」 1601 is inputted.

First, the document analyzer processor 172 extracts a characteristic word candidate 1602 "地図閲覧ソ フト" from the seeds document 1601 "最新の地図閲覧 ソフトについて" stored as an objective document in the work area 141 (step 91).

The compound characteristic word determiner processor 173 then determines whether or not the characteristic word candidate 1602 "地図閲覧ソフト" is a characteristic word including a plurality of words. As a result, it is determined that the characteristic word candidate 1602 "地図閲覧ソフト" includes characteristic words "地図", "閲覧", and "ソフ", namely, the candidate 1602 is a compound characteristic word (step 92).

Subsequently, the characteristic word extractor processor 171 extracts the constituent characteristic words 1604 words "地図", "閲覧", and "ソフト" from the "ソフト" determined as a compound characteristic word by the processor 173 (step 93). For each a compound characteristic word thus extracted, the term frequency counter processor 174 counts a term frequency thereof in the seeds document 1601 (step 94).

The term position acquisition processor 1900 then obtains a term position in the seeds document 1601 of each of the characteristic words extracted by the extraction processor 171 and outputs a characteristic vector 2500 including the obtained term positions (step 95).

According to the embodiment described above, by paying attention to distance between the constituent characteristic words of a compound characteristic word extracted from a seeds document, a high-precision similarity calculation can be carried out using a relationship between words in a registration document. That is, by retrieving as a similar document a document including a compound characteristic word and its constituent character words, a high-precision similar document retrieval can be accomplished without missing similar documents. In the operation, by conducting the weighting operation in consideration of the distance between the constituent characteristic words, the similarity of a registration document less associated with the seeds document can be reduced to thereby minimize noise in the retrieval.

Although the compound characteristic word and the constituent characteristic words extracted therefrom are used as characteristic words in the characteristic vector generator processor 170a of the embodiment, only the constituent characteristic words may be used as the characteristic words. In this case, since the number of elements of the characteristic words employed to calculate the weight coefficient and the similarity is reduced, the retrieval speed can be increased.

In the characteristic vector generator processor 170a of the embodiment, the term position acquisition processor 1900 conducts operation for each characteristic word after the term frequency counter processor 174. However, the term position of a character string of each characteristic word candidate may be obtained when the characteristic word candidate is extracted in the operation of the seeds document analyzer processor 172.

Although the term frequency and the term position are stored for each element in the characteristic vector 2500 of the embodiment, it is also possible in the characteristic vector generation processing for the seeds document that the constituent characteristic words from same source are collectively controlled as one element. In this way, it is not required to determine whether or not each element is a constituent characteristic word in the weight coefficient calculation processing, and hence the retrieval speed is increased.

While the present invention has been described in detail and pictorially in the accompanying drawings, it is not limited to such details since many changes and modifications recognizable to those of ordinary skill in the art may be made to the invention without departing from the spirit and scope thereof.

The invention claimed is:

1. A similar document search method, implemented in a document search and retrieval system including a memory for storing a document database having documents and information concerning the documents and a processor for processing data of the document database, of searching to find and retrieve a document similar to a seeds document from said document database, the method, comprising the steps executed by the processor, of:

first extracting at least one characteristic word from the seeds document including desired retrieval contents;

if the at least one characteristic word extracted by the first extracting step is one of a compound characteristic phrase constructed by a plurality of constituent characteristic words included in the compound characteristic phrase, second extracting of characteristic words included in said compound characteristic phrase and each of said plurality of constituent characteristic words of said compound characteristic phrase;

calculating, according to the characteristic words extracted by the second extracting step, a degree of similarity between the seeds document and each of the documents stored on the document database, by generating characteristic vectors using the characteristic words including the compound characteristic phrase and the constituent characteristic words by which the compound characteristic phrase is constructed, the characteristic vectors being extracted from the seeds document and each of the documents stored on the document database; and outputting a retrieval result, including an indication of the degree of similarity between each of the documents stored on the database and the seeds document, as a result of the degree of similarity between the seeds document and each of the documents stored on the document database as calculated by the similarity calculating step, thereby permitting documents having a high degree of similarity to the seeds document to be retrieved, wherein the similarity calculating step includes the steps of:

calculating a weighting coefficient corresponding to a distance between said constituent characteristic words on the document stored on the document database, said distance being calculated based on term appearance positions of said constituent characteristic words in a phrase including said characteristic words extracted in said second extracting step on the document stored on the document database; and calculating similarity using cosines of angles between the characteristic vectors extracted from the seeds document and the characteristic vectors extracted from each of the documents stored on the document database involving the weighting coefficient.

2. A similar document search system for searching to find and retrieve a document similar to a seeds document from a document database, the system, comprising:

a memory for storing the document database having documents and information concerning the documents; and a processor for processing data of the document database, wherein said processor comprises:

a document analyzer processor for extracting at least one characteristic word from the seeds document including desired retrieval contents, a characteristic word extractor processor for, if the at least one characteristic word extracted by the document analyzer processor is one of a compound characteristic phrase constructed by a plurality of constituent characteristic words included in the compound characteristic phrase, extracting characteristic words included in said compound characteristic phrase and each of said plurality of constituent characteristic words of said compound characteristic phrase, a seeds document similarity calculator processor for calculating, according to the characteristic words extracted by the characteristic word extractor processor, a degree of similarity between the seeds document and each of the documents stored on the document database, by generating characteristic vectors using the characteristic words including the compound characteristic phrase and the constituent characteristic words by which the compound characteristic phrase is constructed, the characteristic vectors being extracted from the seeds document and each of the documents stored on the document database; and a retrieval result output processor for outputting a retrieval result, including an indication of the degree of similarity between each of the documents stored on the database and the seeds document, as a result of the degree of similarity between the seeds document and each of the documents stored on the document database as calculated by the seeds document similarity calculator processor, thereby permitting documents having a high degree of similarity to the seeds document to be retrieved, wherein the seeds document similarity calculator processor includes:

a weighting coefficient calculator processor for calculating a weighting coefficient corresponding to a distance between said constituent characteristic words on the document stored on the document database, said distance being calculated based on term appearance positions of said constituent characteristic words in a phrase including said characteristic words extracted in said second extracting step on the document stored on the document database, and a calculator processor for calculating similarity using cosine of angle between the characteristic vectors extracted from the seeds document and the characteristic vectors extracted from the document stored on the document database involving the weighting coefficient.

3. A program, stored on a storage medium, executable by a document search and retrieval system including a memory for storing a document database having documents and information concerning the documents and a processor for processing data of the document database for searching to find and retrieve a document similar to a seeds document from said document database, the program, when executed cause the document search and retrieval system, to perform the steps of:

first extracting at least one characteristic word from the seeds document including desired retrieval contents;

if the at least one characteristic word extracted by the first extracting step is one of a compound characteristic phrase constructed by a plurality of constituent characteristic words included in the compound characteristic phrase, second extracting of characteristic words included in said compound characteristic phrase and each of said plurality of constituent characteristic words of said compound characteristic phrase;

calculating, according to the characteristic words extracted by the second extracting step, a degree of similarity between the seeds document and each of the documents stored on the document database, by generating characteristic vectors using the characteristic words including the compound characteristic phrase and the constituent characteristic words by which the compound characteristic phrase is constructed, the characteristic vectors being extracted from the seeds document and each of the documents stored on the document database; and outputting a retrieval result, including an indication of the degree of similarity between each of the documents stored on the database and the seeds document, as a result of the degree of similarity between the seeds document and each of the documents stored on the document database as calculated by the calculating step, thereby permitting documents having a high degree of similarity to the seeds document to be retrieved, wherein the calculating step includes the steps of:

calculating a weighting coefficient corresponding to a distance calculated by term appearance position on the seeds document between a constituent characteristic word and another constituent characteristic word which are extracted from one compound characteristic phrase, and calculating similarity using cosine of angle between the characteristic vectors extracted from the seeds document and the characteristic vectors extracted from the document stored on the document database involving the weighting coefficient.

* * * * *